US008682630B2

(12) United States Patent
Kuester et al.

(10) Patent No.: US 8,682,630 B2
(45) Date of Patent: Mar. 25, 2014

(54) MANAGING COMPONENT COUPLING IN AN OBJECT-CENTRIC PROCESS IMPLEMENTATION

(75) Inventors: Jochen M. Kuester, Ruschlikon (CH); Ksenia Wahler, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1294 days.

(21) Appl. No.: 12/484,326

(22) Filed: Jun. 15, 2009

(65) Prior Publication Data
US 2010/0318958 A1   Dec. 16, 2010

(51) Int. Cl.
G06F 17/50   (2006.01)
G06F 7/62    (2006.01)

(52) U.S. Cl.
USPC ................ 703/13; 700/30; 705/51

(58) Field of Classification Search
USPC .......................................... 707/609
See application file for complete search history.

(56) References Cited

U.S. PATENT DOCUMENTS

| | | | | |
|---|---|---|---|---|
| 5,349,541 A | * | 9/1994 | Alexandro et al. | 703/18 |
| 5,418,710 A | * | 5/1995 | Ono et al. | 700/29 |
| 5,453,940 A | * | 9/1995 | Broomhead et al. | 702/109 |
| 5,493,516 A | * | 2/1996 | Broomhead et al. | 702/109 |
| 5,537,329 A | * | 7/1996 | Feldmann et al. | 703/14 |
| 5,539,638 A | * | 7/1996 | Keeler et al. | 701/32.9 |
| 5,555,495 A | * | 9/1996 | Bell et al. | 700/38 |
| 5,649,064 A | * | 7/1997 | Jorgensen et al. | 706/17 |
| 5,677,857 A | * | 10/1997 | Hayashi et al. | 703/8 |
| 5,682,317 A | * | 10/1997 | Keeler et al. | 701/101 |
| 5,689,685 A | * | 11/1997 | Feldmann et al. | 703/2 |
| 5,719,480 A | * | 2/1998 | Bock et al. | 318/568.11 |
| 5,746,511 A | * | 5/1998 | Eryurek et al. | 374/2 |
| 5,787,138 A | * | 7/1998 | Ocieczek et al. | 376/254 |
| 5,828,567 A | * | 10/1998 | Eryurek et al. | 700/79 |
| 5,835,682 A | * | 11/1998 | Broomhead et al. | 706/14 |
| 5,910,765 A | * | 6/1999 | Slemon et al. | 340/517 |
| 5,946,640 A | * | 8/1999 | Goodacre et al. | 702/87 |
| 5,956,663 A | * | 9/1999 | Eryurek | 702/183 |
| 6,017,143 A | * | 1/2000 | Eryurek et al. | 700/51 |
| 6,047,220 A | * | 4/2000 | Eryurek | 700/28 |

(Continued)

OTHER PUBLICATIONS

Briand et al. A Unified Framework for Coupling Measurement in Object-Oriented Systems, IEEE Transactions on Software Engineering, vol. 25, No. 1, Jan./Feb. 1999.*

(Continued)

*Primary Examiner* — Evens J Augustin
(74) *Attorney, Agent, or Firm* — Cantor Colburn LLP; Daniel Morris

(57) ABSTRACT

A method, system, and computer program product for managing component coupling in an object-centric process implementation are provided. The method includes, prior to deriving components that implement a centralized model: analyzing the centralized model to compute couplings within the centralized model resulting in a coupling metric; computing a predicted component model using objects, activities, and the coupling metric of the centralized model; and modifying control flow of the centralized model when a value of the coupling metric exceeds a pre-defined threshold value, re-analyzing the centralized model having the modified control flow, and repeating the computing, modifying and re-analyzing until the coupling metric is less than or equal to the pre-defined threshold. The method also includes implementing an object-centric process having component coupling that is derived from the centralized model when the value of the coupling metric is equal to or less than the pre-defined threshold value.

31 Claims, 18 Drawing Sheets

(56) References Cited

U.S. PATENT DOCUMENTS

| | | | |
|---|---|---|---|
| 6,094,356 | A * | 7/2000 | Fujisawa et al. .............. 361/773 |
| 6,690,819 | B1 * | 2/2004 | Teraji ............................ 382/147 |
| 7,089,529 | B2 | 8/2006 | Sweitzer et al. |
| 7,185,289 | B1 | 2/2007 | Taima |
| 7,685,092 | B2 * | 3/2010 | Reichert et al. ......... 707/999.001 |
| 7,958,486 | B2 | 6/2011 | Tsyganskiy et al. |
| 2002/0091990 | A1 | 7/2002 | Little et al. |
| 2003/0105620 | A1 | 6/2003 | Bowen |
| 2005/0080609 | A1 | 4/2005 | Bhaskaran et al. |
| 2006/0136864 | A1 | 6/2006 | Choi et al. |

OTHER PUBLICATIONS

Mens et al., "Detecting and Resolving Model Inconsistencies Using Transformation Dependency Analysis," Springer-Verlag, 2006, 15 pg.

Nuseibeh et al., "Leveraging Inconsistency in Software Development", IEEE, 2000, 6 pg.

Van Der Stratten et al., "Model Refactorings through Rule-Based Inconsistency Resolution," ACM, 2006, 8 pg.

Santhosh Kumar et al., Adaptive Business Objects: A New Component Model for Business Integration, IBM, Yorktown Heights, NY, USA.

N.S. Caswell et al., Business Artifacts: An Approach to Operational Specification, IBM Systems Journal, Nov. 3, 2003, pp. 428-445, vol. 42, No. 3, USA.

Joachim Herbst et al., Date-Driven Modeling and Coordination of Large Process Structures, 2007, pp. 1-18, DaimlerChrysler AG Group Research, United States.

Joachim Herbst et al., Flexibility of Data-Driven Process Structures, pp. 1-12, DaimlerChrysler Research and Technology, United States.

Lionel C. Briand et al., A Unified Framework for Coupling Measurement in Object-Oriented Systems, IEEE Transactions on Software Engineering, Jan./Feb. 1999, pp. 91-121, vol. 25, No. 1.

K. Bhattacharya et al., A Model-Driven Approach to Industrializing Discovery Process in Pharmaceutical Research, IBM Systems Journal, 2005, pp. 145-162, vol. 44, No. 1, IBM.

W.M.P. Van Der Aalst et al., Workflow Patterns, pp. 1-70.

W.M.P. Van Der Aalst et al., Proclets: A Framework for Lightweight Interacting Workflow Processes, International Journal of Cooperative Information Systems, 2001, pp. 443-481, vol. 10, No. 4, World Scientific Publishing Company.

Hajo A. Reijers and Irene T.P. Vanderfeesten, Cohesion and Coupling Metrics for Workflow Process Design, BPM, 2004, pp. 290-305, Springer-Verlag Berlin Heidelberg.

Harald Gald et al., Consistency of Business Process Models and Object Life Cycles, MoDELS Workshops, 2007, pp. 80-90, Springer-Verlag Berlin Heidelberg.

Harald Gall et al., A Tool for Integrating Object Life Cycle and Business Process Modeling, pp. 1-4, Zurich.

John Grundy et al., Inconsistency Management for Multiple-View Software Development Environments, IEEE Transaction on Software Engineering, 24(11): 1998, 28 pages.

Alexander Egyed, Fixing Inconsistencies in UML Design Models, Proceedings of the 29th International Conference on Software Engineering (ICSE), May 2007, 10 pages.

Jochen M. Kuster et al., Generation of Business Process Models for Object Life Cycle Compliance, 5th International Conference on Business Process Management (BPM), Brisbane, Sep. 2007, 17 pages.

Jochen M. Kuster et al., Improving Inconsistency Resolution with Side-Effect Evaluation and Costs, ACM/IEEE 10th International Conference on Model Driven Engineering Languages and Systems (MODELS), Nashville, Oct. 2007, 15 pages.

U.A. Nickel et al., The FUJABA Environment, Proceedings of the 22nd International Conference on Software Engineering (ICSE), Limerick, Ireland, 2000, 4 pages.

B. Nuseibeh et al., Making Inconsistency Respectable in Software Development, Journal of Systems and Software, Sep. 2001, 19 pages.

Robert Wagner et al., A Plug-In for Flexible and Incremental Consistency Management, Proceedings of the International Conference on the Unified Modeling Language, San Francisco, 2003, 8 pages.

Alexander Egyed, Instant Consistency Checking for the UML, ICSE 2006, ACM Press, 10 pages.

\* cited by examiner

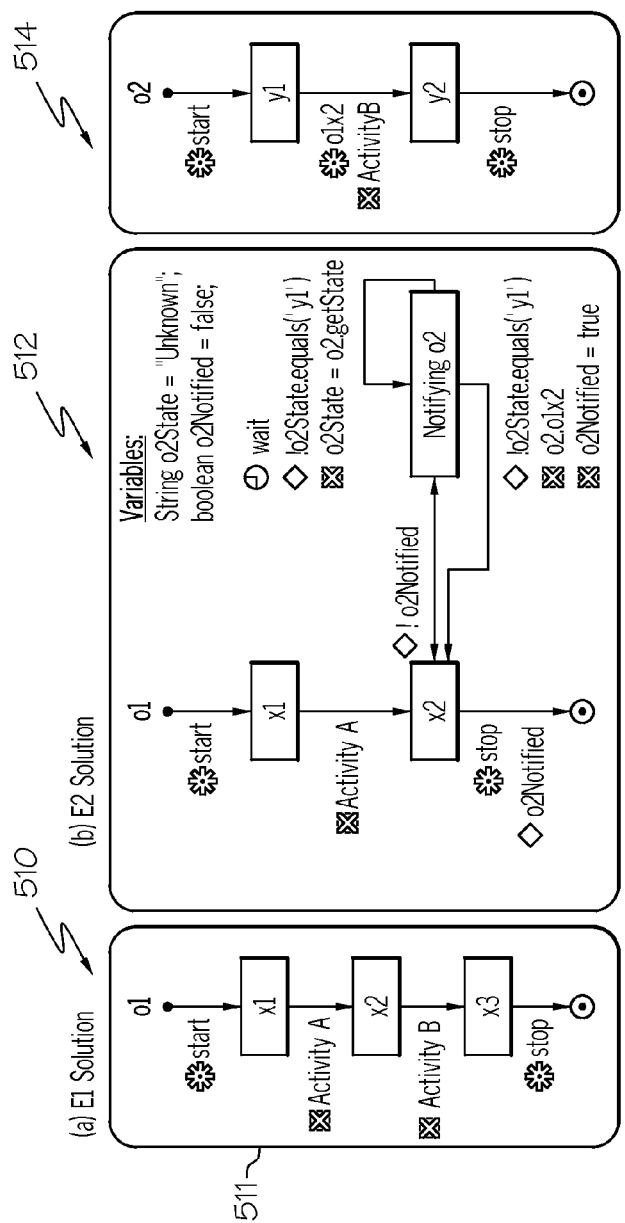
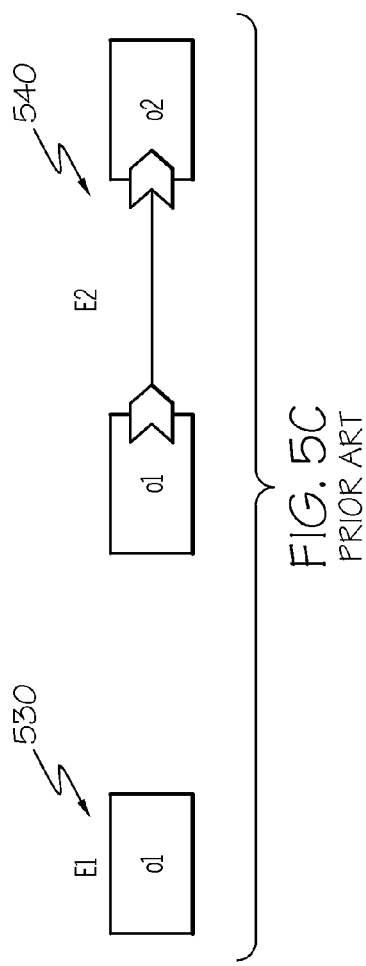
FIG. 5B
PRIOR ART
FIG. 5C
PRIOR ART

MANAGING COMPONENT COUPLING IN AN OBJECT-CENTRIC PROCESS IMPLEMENTATION

BACKGROUND

The present disclosure relates generally to computer-based modeling and, in particular, to management of component coupling in an object-centric process implementation.

Most existing languages for process modeling (e.g., Business Process Modeling Notation (BPMN)) and implementation (e.g., Business Process Execution Language (BPEL)) are activity-centric, since they represent processes as a set of activities connected by control-flow elements to indicate the order of activity execution. In recent years, however, a line of alternative object-centric approaches for modeling and implementing business processes has been proposed, which includes artifact-centric modeling, adaptive business objects, data-driven modeling, and proclets. Activities in the process are distributed among several components, each representing an object life cycle that defines possible states of a particular object and transitions between these states. Interaction among such object life cycle components ensures that the overall process logic is correctly implemented.

Object-centric implementations can be used for distributed process execution and can lead to a more maintainable and adaptable implementation than activity-centric approaches, since behavior of one object can be partially changed without influencing the rest of the process. However, the greater the number of dependencies and interactions between the object life cycle components, the more costly becomes their distribution and the more complicated it is to change their behavior. One of the challenges in object-centric process implementation is, therefore, the management of component interdependencies, commonly referred to as "coupling" in software engineering. Existing approaches do not seem to address this problem directly. For example, artifact-centric modeling describes properties of objects that should be associated with life cycles to distinguish them from other objects. Life cycles are derived for those objects that change state in a given process model. These methods of identifying components run the risk of producing components that are highly coupled. Refactoring the components is one approach to reducing coupling.

What is needed, therefore, is a way to determine, or predict, the coupling of object-centric process implementations prior to deriving the implementations.

SUMMARY

Embodiments of the invention include a method for managing component coupling in an object-centric process implementation. The method includes, prior to deriving components that implement a centralized model: analyzing the centralized model to compute couplings within the centralized model resulting in a coupling metric; computing a predicted component model using objects, activities, and the coupling metric of the centralized model; and modifying control flow of the centralized model when a value of the coupling metric exceeds a pre-defined threshold value, re-analyzing the centralized model having the modified control flow, and repeating the computing, modifying and re-analyzing until the coupling metric is less than or equal to the pre-defined threshold. The method also includes implementing an object-centric process having component coupling that is derived from the centralized model when the value of the coupling metric is equal to or less than the pre-defined threshold value.

Additional embodiments include a system for managing component coupling in an object-centric process implementation. The system includes a computer processor and coupling predictor logic executing on the computer processor. The coupling predictor logic implements a method. The method includes, prior to deriving components that implement a centralized model: analyzing the centralized model to compute couplings within the centralized model resulting in a coupling metric; computing a predicted component model using objects, activities, and the coupling metric of the centralized model; and modifying control flow of the centralized model when a value of the coupling metric exceeds a pre-defined threshold value, re-analyzing the centralized model having the modified control flow, and repeating the computing, modifying and re-analyzing until the coupling metric is less than or equal to the pre-defined threshold. The method also includes implementing an object-centric process having component coupling that is derived from the centralized model when the value of the coupling metric is equal to or less than the pre-defined threshold value.

Further embodiments include a computer program product for managing component coupling in an object-centric process implementation. The computer program product method includes computer-readable program instructions embodied on a computer storage medium, which when executed by a computer processor cause the computer processor to implement a method. The method includes prior to deriving components that implement a centralized model: analyzing the centralized model to compute couplings within the centralized model resulting in a coupling metric; computing a predicted component model using objects, activities, and the coupling metric of the centralized model; and modifying control flow of the centralized model when a value of the coupling metric exceeds a pre-defined threshold value, re-analyzing the centralized model having the modified control flow, and repeating the computing, modifying and re-analyzing until the coupling metric is less than or equal to the pre-defined threshold. The method also includes implementing an object-centric process having component coupling that is derived from the centralized model when the value of the coupling metric is equal to or less than the pre-defined threshold value.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5B depicts BSMs implemented to represent the activity-centric models for the workflow pattern of FIG. 5A; and FIG. 5C depicts a diagram of two assembly models corresponding to the respective workflow pattern illustrated in FIG. 5A, and the BSMs illustrated in FIG. 5B;

The detailed description explains the exemplary embodiments of the invention, together with advantages and features, by way of example with reference to the drawings.

DETAILED DESCRIPTION

Exemplary embodiments include a method, system, and computer program product for managing component coupling in an object-centric process implementation. The component coupling management processes provide a way to predict coupling for an object-centric process implementation prior to deriving the components of the object-centric process implementation. More specifically, the component coupling management processes provide the ability to compute the expected coupling of an object-centric implementation for a given centralized model prior to actually deriving the object-centric implementation. Having this information in advance of the implementation allows a developer to take preventive actions to arrive at a better decomposition of the final implementation as needed. In this manner, the component coupling management processes facilitate coupling-driven refactoring of a centralized model (e.g., a business process model), whereby the impact of centralized model changes on the coupling value can be immediately computed. Additionally, the component coupling management processes may be easily extended to include other sources of coupling in the coupling prediction. Control flow in the original centralized model can be refactored if a high coupling value is predicted. An exemplary method for computing coupling may then be iteratively applied to drive the refactoring of the centralized model.

Figure 1:
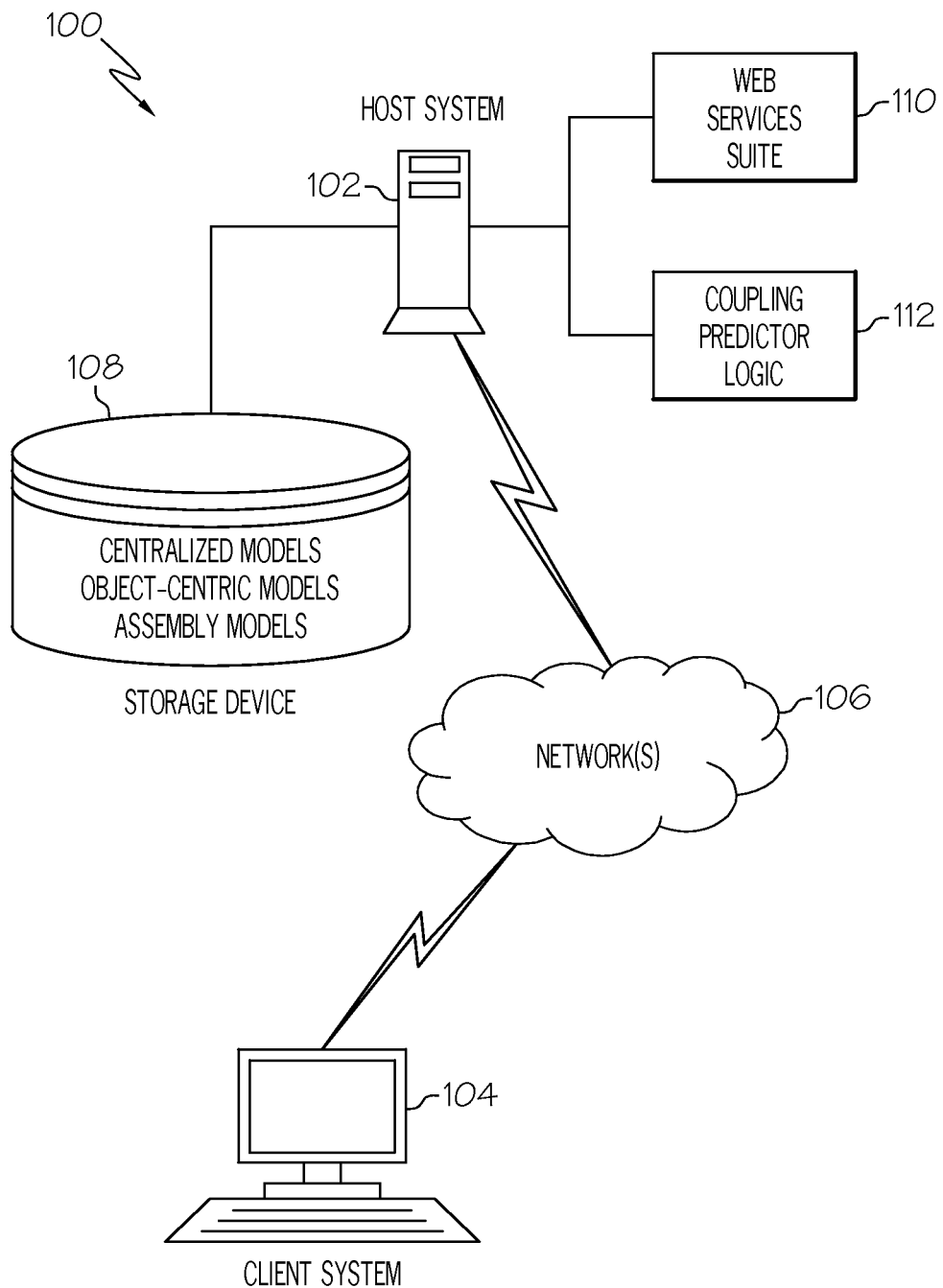
FIG. 1 is a block diagram depicting a system for implementing component coupling management processes in exemplary embodiments.

Turning now to FIG. 1, a system 100 upon which the component coupling management processes may be implemented will now be described in accordance with exemplary embodiments. The system 100 of FIG. 1 includes a host system 102 in communication with a storage device 108 and one or more client systems (e.g., client system 104). The system 100 supports coupling predictor logic 112 that is executed in conjunction with one or more computer modules or programs (e.g., Web services suite 110) located on the host system 102 or other network entity in communication with the host system 102, either directly or via one more networks, such as network 106. The coupling predictor logic 112, in conjunction with these other modules or programs, and which is also referred to herein as "process software," enables the management of models, including the creation and analysis of centralized models (through predictive coupling), as well as modification and execution of the models. These computer programs or modules may include, but are not limited to, e.g., an application server (e.g., IBM® WebSphere® Application Server), development application(s) (e.g., IBM® WebSphere® Developer), business process management application(s) (e.g., IBM® WebSphere® Business Integration Server), and process modeling application(s) (e.g., IBM® WebSphere® Business Modeler), to name a few. Collectively, and for ease of explanation, these programs or modules are referred to herein as Web services suite 110. The Web services suite 110 works collaboratively with the coupling predictor logic 112 to provide application integration, data access and integration, business processing, and distributed transaction monitoring, as well as support for application development, and business process modeling, management, and execution in support of the component coupling management processes described herein.

The host system 102 may be in direct communication with the storage device 108 and/or the client system 104, or may be coupled to the storage device 108 and/or client system 104 via, e.g., one or more wireline or wireless networks, such as networks 106. It is understood that the storage device 108 may be implemented using memory contained in the host system 102 or it may be a separate physical device (as illustrated in FIG. 1). The storage device 108 may be logically addressable as a consolidated data source across a distributed environment that includes the network(s) 106.

The storage device 108 stores a variety of data and information in support of the component coupling management processes. For example, the storage device 108 stores centralized models (e.g., activity-centric business process models), object-centric models, and assembly models, to name a few. A centralized model refers to an activity-centric model that defines a collection of related, structured activities or tasks that are implemented to produce a specific outcome via, e.g., a defined workflow. One example of a centralized model includes a business process model, which refers to a model of one or more business processes (e.g., management, operational, and supporting processes) including defined operations and instructions designed to achieve some intended objective of an organization. In an exemplary embodiment, the component coupling management processes analyze centralized models to predict coupling values, modify the centralized models pursuant to the analysis (if needed), and generate a component-based object-centric process that is executable by the host system 102 (e.g., via an execution engine provided therefore).

In one exemplary embodiment, the host system 102 operates as a database server and coordinates access to application data including data stored on the storage device 108. The host system 102 may be implemented using one or more servers operating in response to a computer program stored in a storage medium accessible by the server. The host system 102 may operate as a network server (e.g., a web server) to communicate with the client system 104. The host system 102 may be implemented as a high-speed processing device (e.g., a mainframe computer) and handles sending and receiving information to and from the client system 104. As indicated above, the host system 102 may also operate as an application server (e.g., IBM® WebSphere® Application Server). The host system 102 executes one or more computer programs (e.g., the Web services suite 110 and coupling predictor logic 112). The client system 104 may be operated by an application developer, software engineer, programmer, or other representative entity of the enterprise of host system 102. The client system 104 may be implemented as a general-purpose computer or desktop device. Processing may be shared by the client system 104 and the host system 102 by providing an application (e.g., Java™ applet) to the client system 104.

As previously described, it is understood that separate servers may be utilized to implement the network server functions and the application server functions. Alternatively, the network server and the application server may be implemented by a single server executing computer programs to perform the requisite functions.

In a business driven development approach, a model is iteratively refined into what are referred to as implementation models that can be executed by a processing engine, such as the host system 102. In this context, implementation models may be either activity-centric or object-centric. In an object-centric implementation, the business process logic is distributed among several components, each representing a life cycle of some object. Interaction between components ensures that the overall process logic is correctly implemented.

Figure 2:
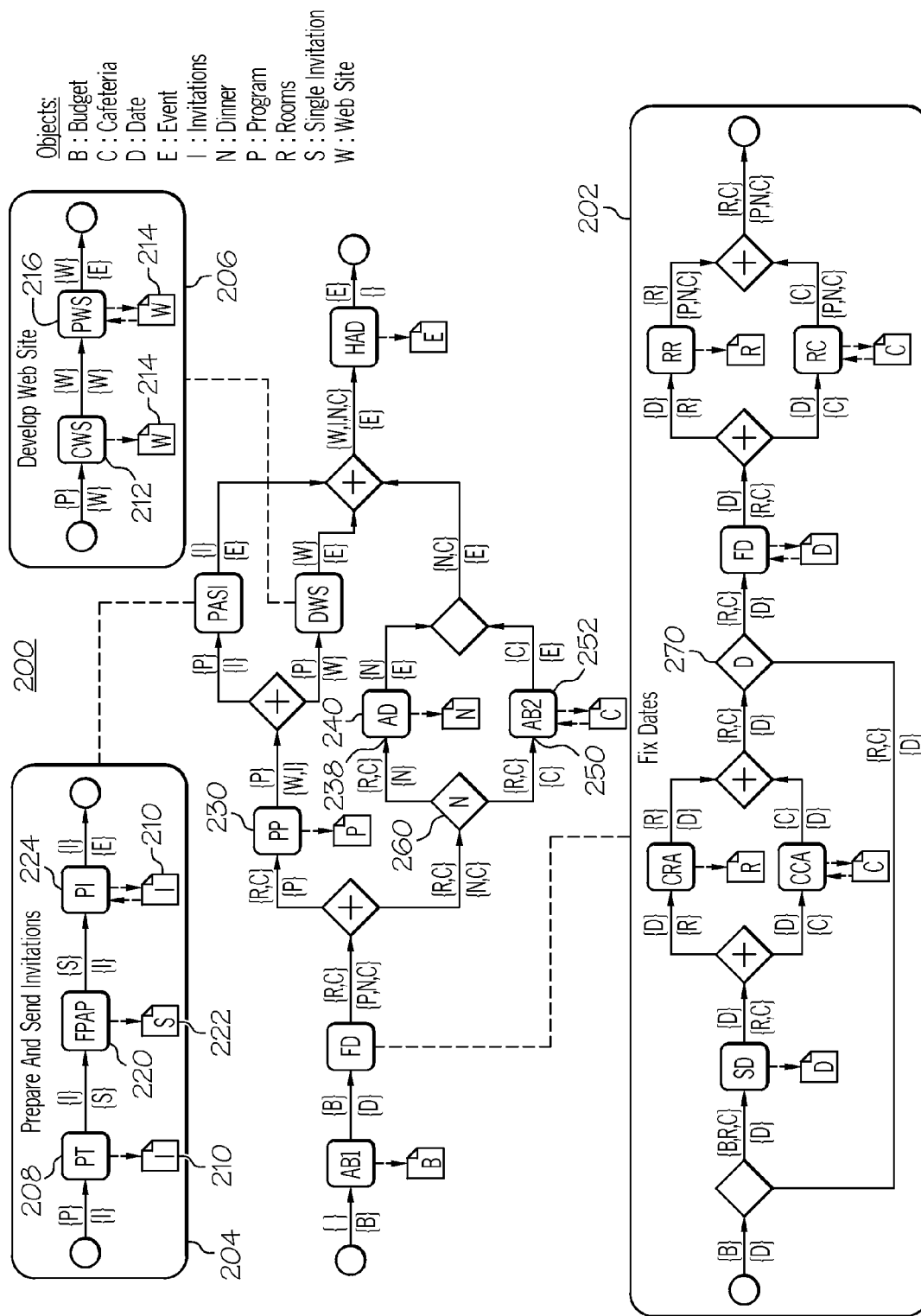
FIG. 2 is a diagram of a centralized model with sample data illustrating object pairs derived from the component coupling management processes in exemplary embodiments.

Turning now to FIG. 2, a centralized model 200 with sample data will now be described in an exemplary embodiment. The centralized model 200 of FIG. 2 includes object and activity elements, as well as control flow elements, which collectively represent the organization of alumni events for an entity (e.g., a university). It will be understood that the centralized model 200 elements and contextual representations of an alumni event are provided herein for illustrative purposes and are not to be construed as limiting in scope.

The centralized model 200 represents an activity-centric model. Model 200 includes activities that are depicted as square/rectangular boxes having rounded corners. The model 200 also includes objects that are depicted as rectangular-shaped boxes having a folded corner. As shown in FIG. 2, there are ten objects: B (budget), C (cafeteria), D (date), E (event), I (invitations), N (dinner), P (program), R (rooms), S (single invitation), and W (website). Solid-head arrows represent control flows between activities, and open head arrows represent inputs/outputs between activities and their corresponding objects. Circles represent start and end nodes in the model 200, and diamond shaped boxes represent decision points and merge points.

As shown in FIG. 2, a budget (B) is approved, the date (D) of the event is fixed, and two items occur in parallel: the program (P), invitations (I), and website (W) are prepared; and catering (C) is arranged.

The centralized model 200 of FIG. 2 contains three sub-processes: Fix Date 202, Prepare And Send Invitations 204, and Develop Web Site 206. Each of the activities of a business process generally transforms some objects by changing their state to contribute to the final goal of the process. For each atomic activity in the alumni day process of FIG. 2, the state-changing objects are indicated (e.g., a single unidirectional open head arrow represents an output of an activity, and two-directional open head arrows reflect that the corresponding object is both an input and an output of an activity). For example, a Create Web Site (CWS) activity 212 in sub-process 206 produces a Web Site (W) object 214 in state Drafted (Drafted state 454 generally shown in FIG. 4A), and a Publish Web Site (PWS) activity 216 changes the state of the Web Site object (W) 214 from Drafted to Published (Published state 456 generally shown in FIG. 4A). In the Prepare And Send Invitations sub-process 204, Prepare Template (PT) activity 208 creates an Invitations object (I) 210 in state TemplatePrepared (state not shown), and then multiple instances of a Fill, Print And Pack (FPAP) activity 220 are performed in parallel, each creating a Single Invitation (S) object 222. Once all instances of Fill, Print And Pack activity 220 have completed, a Post Invitations (PI) activity 224 updates the state of invitations to Posted (state not shown).

In an object-centric implementation of the alumni day process of model 200, the process logic would be split into ten object life cycle components, assuming an approach where one component is derived for each state-changing object. Each object life cycle component may be implemented, e.g., as a Business State Machine (BSM).

A BSM is a finite state automaton, tailored for execution in a service-oriented environment. Each BSM may include several of the following: interfaces, references and variables. Interfaces may include operations, such as start and stop, and the defined operations may be invoked on the BSM. As indicated above, a BSM may include one or more references (r), referencing an interface of another BSM, which may in turn, include its own operations. In addition, operations typically include parameters.

State transitions in BSMs typically follow an event-condition-action paradigm. A state transition may be triggered either by an expiration of a timeout or by an invocation of an operation defined in one of BSM's interfaces. Once a transition is triggered, its associated condition, if any, is evaluated. If the condition evaluates to "true" or there is no condition, the action associated with the transition, if any, is performed and the target state of the transition is entered. An action either invokes an operation on one of BSM's references or performs some other processing specified in a custom language, such as Java™.

At runtime, each BSM instance is associated with a correlation ID, which is specified in the parameters of the operation associated with the initial state transition (e.g., start operation in a BSM). A runtime engine (e.g., a processor component of the host system 102) creates a new BSM instance when it receives an operation call with a correlation ID that does not correspond to an existing BSM instance.

For the implementation of the alumni day process described in FIG. 2, the process activities may be distributed among ten BSMs (Budget, Cafeteria, Date, etc). For purposes of illustration, and ease of explanation, it is assumed that one activity changes the state of exactly one object, as in the centralized model 200 shown in FIG. 2. Each activity is then placed into the BSM representing the state-changing object for this activity. However, as further described herein, an exemplary embodiment includes extending this approach, whereby the component coupling management processes may be applied to activities that change the state of more than one object.

Figure 4A:
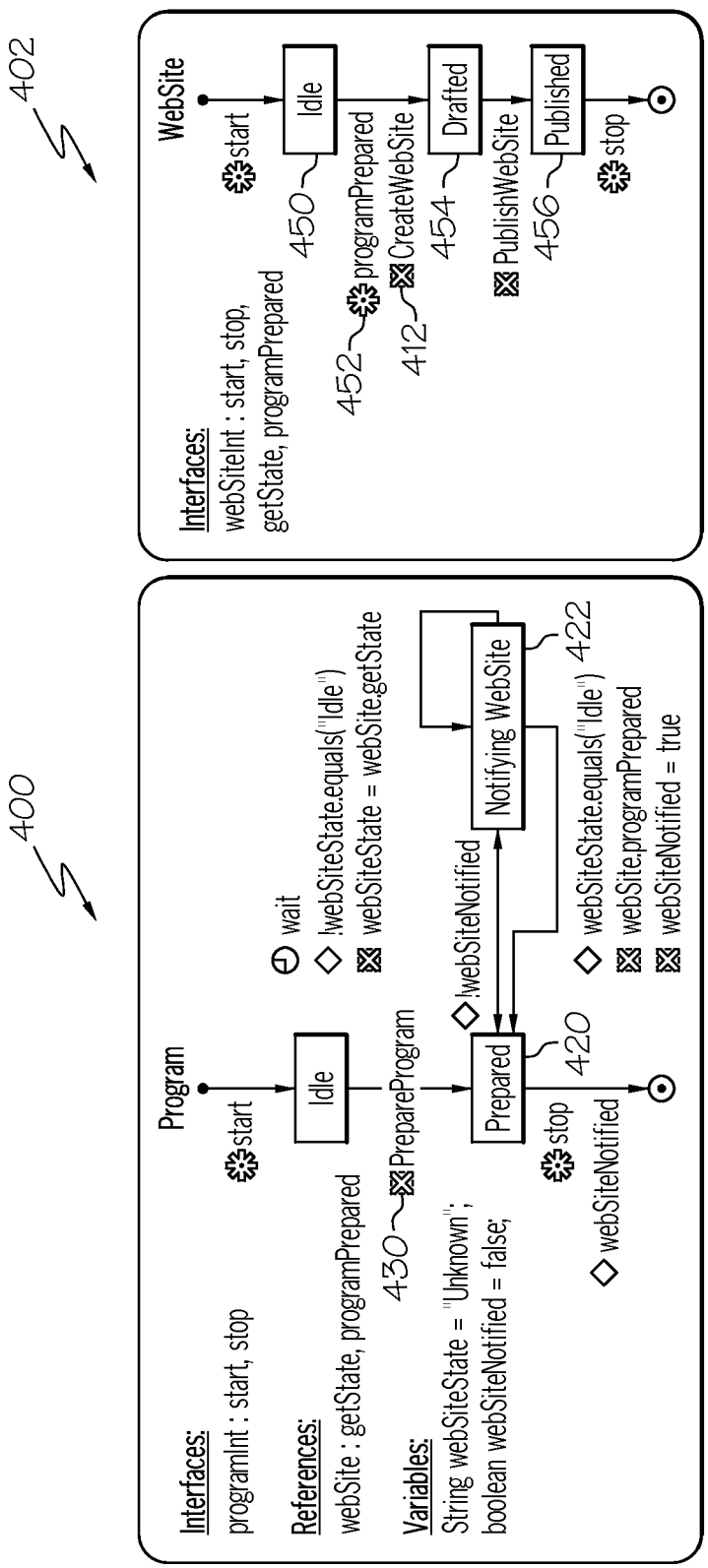
FIG. 4A depicts diagrams of business state machines (BSMs) corresponding to a portion of the elements of the centralized model of FIG. 2.

Partial implementations of BSMs generated for the Program (P) and WebSite (W) object components are shown in FIG. 4A as BSM 400 and BSM 402, respectively. Activities that change state of these objects are mapped to actions associated with state transitions in the BSMs 400 and 402, e.g., PrepareProgram 430 and CreateWebSite 412 actions. These actions can be implemented to invoke service operations, human tasks, etc. In the centralized model 200 of FIG. 2, a PrepareProgram (PP) activity 230 (corresponding to action PrepareProgram 430 in BSM 400) needs to complete before the CreateWebSite (CWS) activity 212 (corresponding to action CreateWebSite 412 in BSM 402). Synchronization of the Program BSM 400 and WebSite BSM 402 is implemented to preserve this dependency: After the PrepareProgram action 430 is performed in the Program BSM 400 and a Prepared state 420 is reached, the Program BSM 400 transits to state Notifying WebSite 422. In this state, the Program BSM 400 repeatedly queries the state of the WebSite BSM 402. Once the WebSite BSM 402 reaches a state Idle 450, the Program BSM 400 notifies the WebSite BSM 402 that it has reached the state Prepared 420 by invoking a programPrepared operation 452. The Program BSM 400 then transits back to state Prepared 420 and the WebSite BSM 402 performs the CreateWebSite action 412.

As indicated above, BSMs 400 and 402 illustrate only a portion of the components representative of the alumni model 200 of FIG. 2. In a complete BSM implementation of the model 200, many such synchronizations would need to be implemented, e.g., Program BSM 400 needs to synchronize with an Invitations BSM (not shown).

Figure 4B:
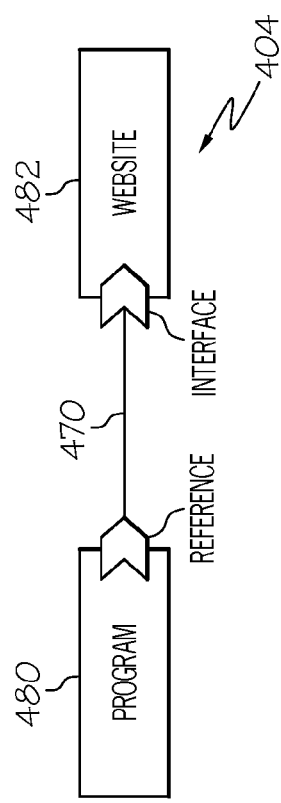
FIG. 4B depicts an assembly model generated from the BSMs depicted in FIG. 4A.

Aside from additional states and transitions within BSMs, synchronization leads to interface bindings between the BSMs. These bindings may be represented, e.g., using Service Component Architecture (SCA), which is a service-oriented component framework. Each BSM may be an implementation of an SCA component (also referred to herein as "component"). An assembly model in SCA is a representation of directed communication channels (in SCA, these channels are referred to as "wires") between components. An assembly model 404 created for, and representing the BSMs 400 and 402 from FIG. 4A, is shown in FIG. 4B. Synchronization of the WebSite BSM 402 and Program BSM 400 involves connection of the components, Program 480 and WebSite 482, by a communication channel 470 (e.g., wire) in the assembly model 404.

While the above-referenced approach is described using SCA and BSMs, it will be understood that other component frameworks (not necessarily based on services) and other object-centric approaches may be utilized in order to realize the advantages of the exemplary embodiments. For example, adaptive business objects (ABO) are based on communicating automata, and the component coupling management processes may be implemented once every ABO is encapsulated in a component and communication channels between the components are made explicit. Further, in data-driven modeling, object life cycles are synchronized by what may be referred to as external state transitions. For coupling computations, each life cycle may be seen as a component, and communication channels may be introduced between components whose lifecycles are connected by external state transitions. Additionally, Proclets use WF-nets to represent object life cycles and make use of explicit communication channels. Although more advanced communication options, such as multicast and broadcast, are supported in Proclets, the component coupling management processes of the exemplary embodiments may be readily adapted and applied thereto.

As used herein, and provided as Definition 1, an assembly model is defined as a tuple M=(C, φ), where C is the set of components in M, and $\phi \subset C \times C$ is the communication channel (wire) relation between components. In the context of SCA, the term "coupling" may be defined as the interdependencies of components in an assembly model. In an exemplary embodiment, coupling of an assembly model is quantified by defining a coupling (e.g., interface coupling) metric, that indicates the degree or extent of coupling that exists in a given assembly model.

Using the above assembly model designation, a definition for coupling is provided: Given an assembly model M=(C, φ), its coupling (e.g., interface coupling) is defined in Definition 2 as follows:

$$p(M) = \begin{cases} 0 & \text{if } |C| = 0 \text{ or } 1 \\ \dfrac{|\phi|}{|C| * (|C| - 1)} & \text{otherwise} \end{cases}$$

Thus, coupling (e.g., interface coupling) represents the ratio between the actual number of communication channels (e.g., wires) in the assembly model and the maximum possible number of communication channels between the components in the assembly model. For example, a coupling value of 0 (zero) means that there is no interaction at all between the components. This implies that distribution of these components does not incur any communication costs, and the implementation of each component can be maintained and its behavior adapted at run time with no side effects on the other components. On the contrary, a coupling value of 1 (one) means that every component interacts with every other component. Distribution of such components typically incurs high communication costs, and maintenance or adaptation of one component affects the behavior of all other components.

Using the above definitions, the coupling of the assembly model shown in FIG. 4B is:

$$\frac{1}{2*1} = 0.5.$$

Implementation of different workflow patterns using BSMs typically introduces communication channels, or wires, between BSM components and, thus, contributes to the coupling of the resulting assembly model. Workflow patterns may be used as a benchmark for exploring how common process behaviors can be represented in different business process modeling and implementation languages.

Figure 5A:
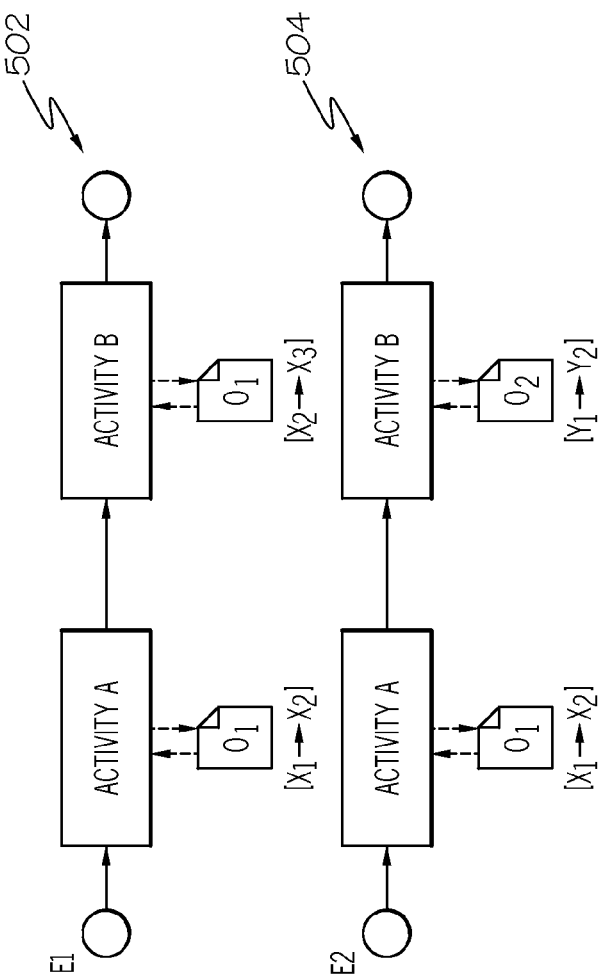
FIG. 5A depicts two examples of a common workflow pattern, expressed as activity-centric models.

As an example, FIG. 5A illustrates two examples (E1 and E2) of a common workflow pattern expressed as activity-centric process models 502 and 504; FIG. 5B illustrates BSM implementations 510, 512, and 514 of the two activity-centric process models 502 and 504 shown in FIG. 5A; and FIG. 5C illustrates two assembly models 530 and 540, each generated from the respective activity-centric process models (of FIG. 5A) and corresponding BSM representations (of FIG. 5B) for the given workflow pattern, as will now be described.

Two examples of a common control-flow pattern, expressed as activity-centric process models 502 and 504, are shown in FIG. 5A. For each workflow pattern, any requirements the pattern has on synchronization of BSMs and its contribution to the coupling of the overall implementation may be identified as described further herein.

The activity-centric process models 502 and 504 of the workflow pattern shown in FIG. 5A each represents a "sequence" workflow pattern (WP1) in which several activities are executed one after another. In example E1 of this pattern, ActivityA and ActivityB change the state of the same object o1, while in example E2 of this pattern, ActivityA and ActivityB change the state of different objects, o1 and o2. The solution (i.e., BSM implementation) for the example of E1 is straightforward, as shown in BSM 510 of FIG. 5B (interface and reference definitions omitted). The BSM implementation 510 of E1 comprises a single component 511, which is reflected in the resulting assembly model 530 shown in FIG. 5C. A solution (i.e., BSM implementations 512 and 514) for example E2 is also shown in FIG. 5B, where BSMs 512 and 514 for respective objects o1 and o2 represent the life cycles of objects o1 and o2.

As shown in the BSMs 512 and 514 of FIG. 5B, once ActivityA is performed by object o1, object o1 notifies object o2 that it has reached state x2 by first ensuring that object o2 is in state y1 and then invoking the o1x2 operation on object o2. Once the operation o1x2 is invoked on object o2, ActivityB is performed by object o2. The resulting assembly model 540 shown in FIG. 5C has an interface coupling of $$\frac{1}{2*1} = 0.5.$$

Synchronization needs identified for the workflow pattern (WP1) will now be described. A generic instance of WP1 comprises activities $a_1, \ldots, a_n$ that change states of objects $o_1, \ldots, o_n$, respectively. A pair of activities $a_i, a_{i+1}$ with $1 \le i < n$ requires a synchronization of BSM $o_i$ and BSM $o_{i+1}$ if and only if $o_i \ne o_{i+1}$. This type of synchronization is placed into the control handover synchronization category. The term, "control handover" refers to synchronization performed between two components for the sole purpose of handing over control from one component to another"?). For this type of control handover, a communication channel from BSM $o_i$ to BSM $o_{i+1}$ needs to be present in the assembly model. As indicated above, introduction of these communication channels contributes to the overall coupling of the resulting assembly model.

Other types of common workflow patterns include Parallel Split (WP2), Synchronization (WP3), Exclusive Choice (WP4), Simple Merge (WP5), Arbitrary Cycles (WP10), and Multiple Instances with A Priori Run-Time Knowledge (WP14).

In WP2 (not shown), several activities are executed simultaneously or in any possible order and in WP3 (not shown), several parallel threads are joined together into a single control thread. It will be understood that the component coupling management processes are not only applicable to process models where each parallel split has a corresponding synchronization, but also extend examination of the combination of these two patterns together. In implementing a BSM solution for activity-centric process models expressing the components of WP2 and WP3, since all BSMs, by default, are executed concurrently, no explicit parallel split is required. Synchronization of the threads may be performed using notifications, similar as in the E2 solution described above with respect to WP1 and illustrated in FIG. 5B. For example, one BSM waits to receive notifications from one or more objects before performing a particular activity.

Synchronization for the workflow patterns WP2 and WP3 will now be described. Since instances of WP2 do not require any interaction between BSMs, they do not contribute communication channels to the resulting assembly model and have no effect on coupling. A generic instance of WP3 comprises activities $a_1, \ldots, a_n$ that all need to complete before activity $a_{n+1}$ can begin execution. Assuming that $a_1, \ldots, a_n$, $a_{n+1}$ change states of objects $o_1, \ldots o_n, o_{n+1}$, respectively, a pair of activities $a_i, a_{n+1}$ with $1 \le i \le n$ requires a synchronization of BSMs if and only if $o_i \ne o_{n+1}$. These synchronizations also fall into the control handover category, as described above with respect to WP1.

Figure 6A:
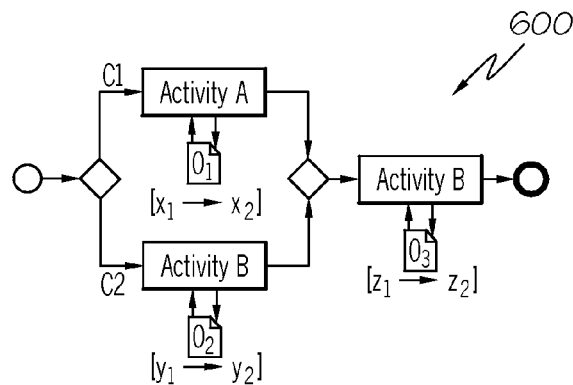
FIG. 6A depicts a diagram of alternative workflow patterns, expressed as activity-centric process models.
Figure 6B:
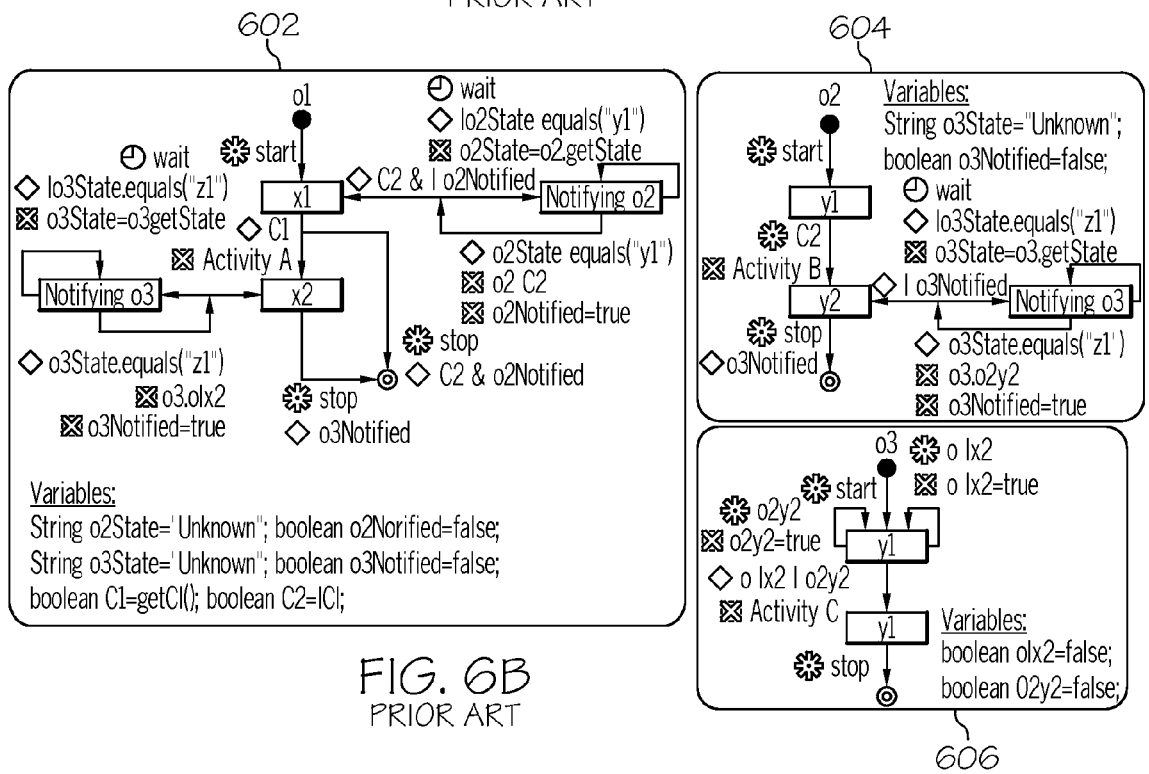
FIG. 6B depicts BSMs implemented to represent the activity-centric process models for workflow patterns shown in FIG. 6A.
Figure 6C:
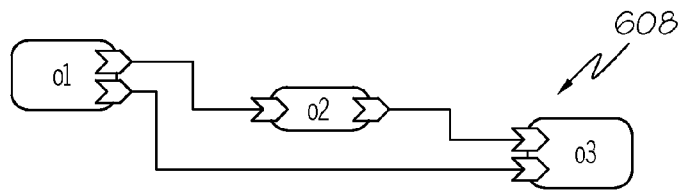
FIG. 6C depicts a diagram of an assembly model corresponding to the respective workflow patterns illustrated in FIG. 6A, and the BSMs illustrated in FIG. 6B.

In workflow pattern WP4 (Exclusive Choice), one out of several activities is executed based on the outcome of a decision and in workflow pattern WP5 (Simple Merge), several alternative threads are joined into one control thread without synchronization. FIG. 6A represents an example of WP4 and WP5 expressed as an activity centric model 600. In a BSM solution for the WP4 pattern, which is illustrated in FIG. 6B, a decision needs to be placed into one of the BSMs, (e.g., as shown in a BSM 602 (o1) in FIG. 6B, two transitions going out of a first state (x1) of the BSM 602 with two conditions (C1) and (C2)). Once the decision is evaluated in the corresponding object (o1) for BSM 602, either a first activity (A) is performed (C1 is true) or another object (o2) is notified (e.g., object o2 of BSM 604) and a second activity (B) is performed in the other object (o2)(C2 is true). With respect to the WP5 pattern, merging of alternative control threads is implemented similarly to the synchronization solution described for WP2 and WP3, except a BSM (e.g., BSM 606 of FIG. 6B) performs a corresponding activity (C) as soon as it receives an operation call. The coupling value of these components may be higher than those in the assembly models described above since an additional communication channel is needed for communicating the decision outcome. An assembly model 608 for the BSMs of FIG. 6B is shown in FIG. 6C.

Synchronization for the workflow patterns WP4 and WP5 will now be described. A generic instance of WP4 comprises a decision d and activities $a_1, \ldots, a_n$ that change states of objects $o_1, \ldots, o_n$, where one of these activities is executed depending on the evaluation of d's conditions. It is assumed that evaluation of d can be assigned to an object $o_i$ where $1 \le i \le n$. BSM $o_i$ requires synchronization with each BSM $o_j$, where $1 \le j \le n$ and $o_i \ne o_j$. These synchronizations are placed into the decision notification synchronization category. The decision notification synchronization category serves to notify one component of a decision outcome. Control handover synchronizations for instances of WP5 may be implemented in a similar manner as that described above with respect to WP1 and WP3.

Figure 7A:
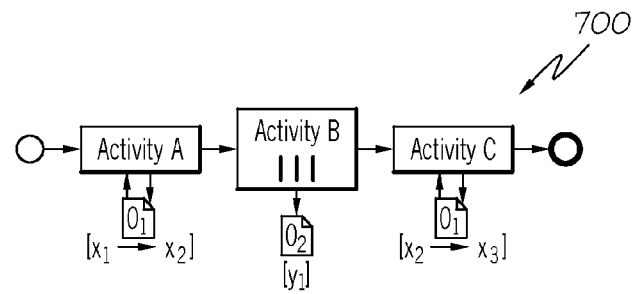
FIG. 7A depicts a diagram of yet another alternative workflow pattern, expressed as an activity-centric process model.

In FIG. 7A, an example of WP14, expressed as an activity-centric process model 700, is illustrated. In the example model 700, multiple instances of the same activity are created, all of which need to complete before a subsequent activity can be executed. The number of instances is not known at design time, but is determined at run time before the activity instances are created. This pattern can be used to represent processing of object collections. For example, following execution of an activity A, a collection of objects o2 is processed by multiple instances of an activity B. In this example, each activity instance creates a new object o2 in a given state y1. Once all instances of this Activity B have completed, another Activity C is executed. This example corresponds to the Prepare And Send Invitations sub-process 204 in FIG. 2, where Invitations (I) and Single Invitation (S) objects take the role of the objects described in WP14.

Figure 7B:
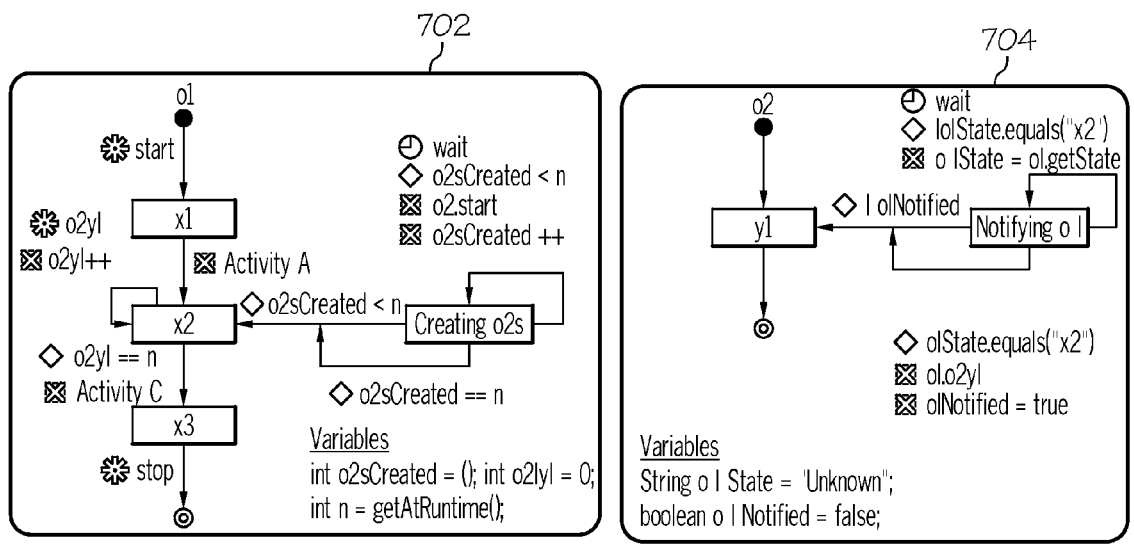
FIG. 7B depicts BSMs implemented to represent the activity-centric process model for the workflow pattern shown in FIG. 7A.
Figure 7C:
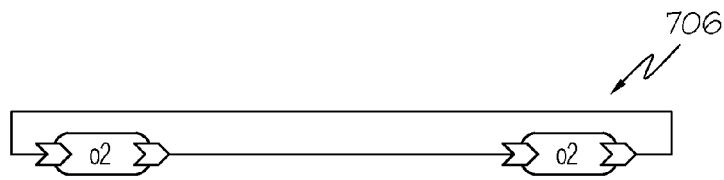
FIG. 7C depicts a diagram of an assembly model corresponding to the respective activity-centric process model illustrated in FIG. 7A, and the BSMs illustrated in FIG. 7B.

A BSM implementation for WP14 is shown in FIG. 7B, as will now be described. After performing the first Activity A, a first object o1 (shown as BSM 702 in FIG. 7B) transits to a first state x2 and then to another state objectCreating o2s, where it creates n instances of the objects' o2 BSM (illustrated as BSM 704 in FIG. 7B) by repeatedly invoking a start operation with a unique correlation ID. Each object o2 instance performs the second Activity B and then notifies the first object o1 that it has reached the second state y1. Once the first object o1 receives notifications from all the other objects' o2 instances, it performs a third activity C and transits to a third state x3. An assembly model 706 representing the BSM implementations of FIG. 7B is illustrated in FIG. 7C.

Synchronization for the workflow pattern WP14 will now be described. A generic instance of WP14 comprises activities $a_1$, $a_2$, $a_3$ that change states of objects $o_1$, $o_2$, $o_3$, where activity $a_2$ is to be instantiated multiple times. Provided that $a_1$ and $a_3$ are not themselves multiple instance activities, the following control handovers are required: from BSM $o_1$ to instances of BSM $o_2$, and from instances of BSM $o_2$ to BSM $o_3$. Although the number of synchronizations at run time may vary, the contribution to coupling is constant, since two communication channels, one between pair ($o_1$, $o_2$) and another between pair ($o_2$, $o_3$), are introduced into the assembly model to enable the synchronizations (this also holds if $o_1=o_3$). The case where $o_1=o_2$ and $o_2=o_3$ is an exception, since in this case only one communication channel for the pair ($o_2,o_2$) would be introduced into the assembly model.

Another workflow pattern commonly encountered in process models is Arbitrary Cycles (WP10). This pattern may be implemented in BSMs as a combination of WP5 and WP4 pattern instances.

Figure 3:
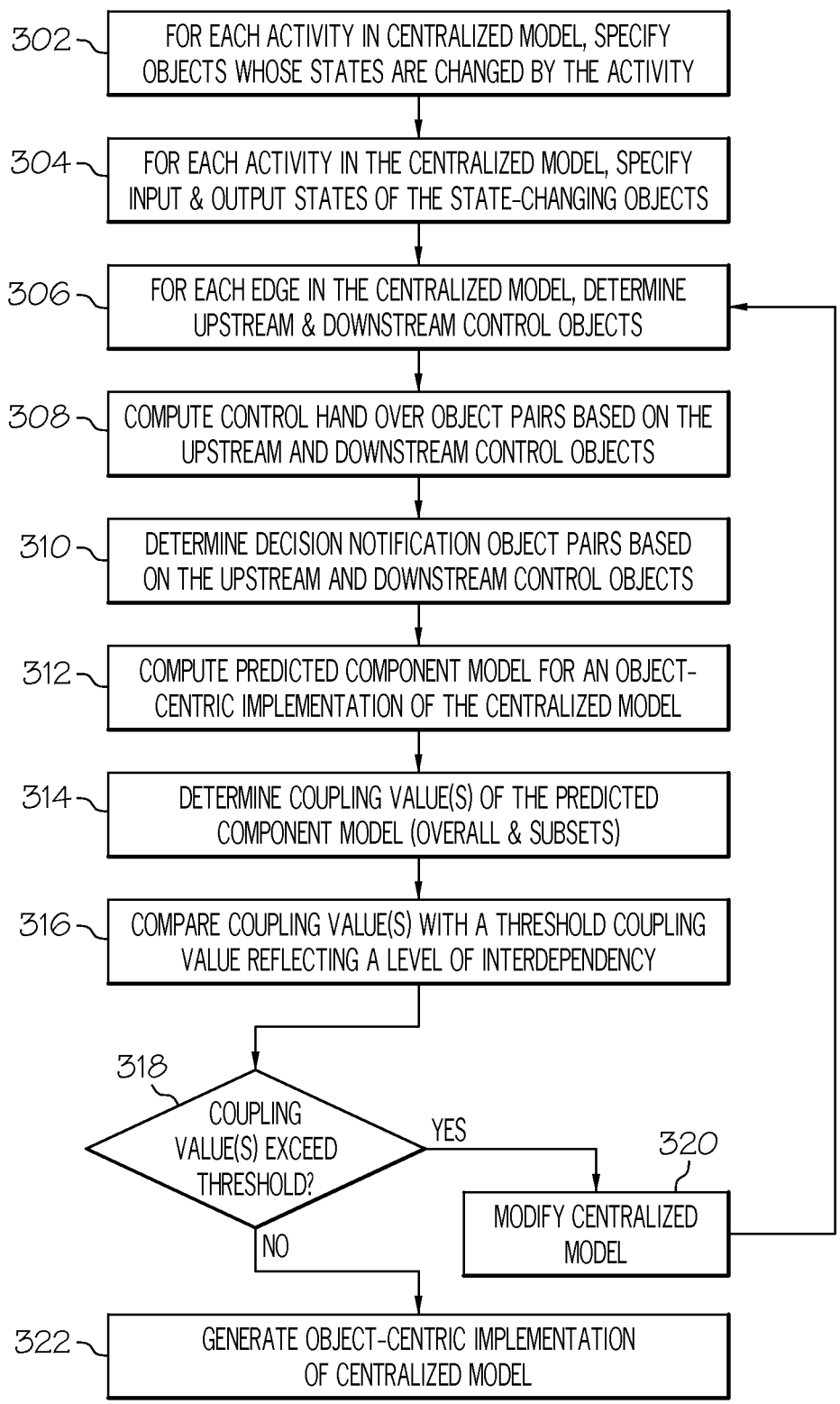
FIG. 3 is a flow diagram describing a process for implementing the component coupling management processes in exemplary embodiments.

As indicated above, common workflow patterns may be implemented using BSMs. In an exemplary embodiment, the number of control handovers and decision notifications may be computed for a given centralized model and used to compute the expected coupling of a BSM implementation via the coupling predictor logic 112, in conjunction with the Web services suite 110, executing on the host system 102 of FIG. 1, as will now be described with respect to FIGS. 2, 3, and 8.

For purposes of illustration, it is assumed that a centralized (process) model provided as a specification for a BSM implementation includes instances of one or more common workflow patterns (e.g., WP1-WP5, WP10, and WP14) and has each activity associated with one state-changing object, such as illustrated in the alumni day model 200 in FIG. 2. As sub-process hierarchy in a given centralized model can be flattened for processing, the following Definition 3 is provided for a centralized model (also referred to herein as "process" model).

A process model is a tuple P=(G, O, σ):
 G=(N, E) is a directed graph, where each node n∈N is either a start node, stop node, activity, fork, join, decision, or merge; and each edge e∈E. For ease of explanation, $N_A$ and $N_D$ are used herein to denote activities and decisions in N, respectively.

O is the set of objects whose states are changed by activities a∈$N_A$

σ⊆$N_A$×O is the state-changing relation between activities and objects. The symbol $o_a$ is used to denote the object whose state is changed by activity a∈$N_A$, i.e., (a, $o_a$)∈σ.

Given a process model P, the number of components in the assembly model of its BSM implementation is equal to the number of objects whose states are changed in P, assuming a simple mapping. As indicated in the flow diagram of FIG. 3, for each activity in the centralized model, objects whose states are changed by the activity are determined by the coupling predictor logic 112 in step 302. Additionally, in step 304, for each activity in the centralized model, input and output states of these state-changing objects are also specified by the coupling predictor logic 112. As indicated above, the number of communication channels between the components depends on the control handover and decision notification synchronizations that need to take place between the BSMs. Since all the synchronizations required by the common workflow patterns fall into these two categories, all object pairs that require such synchronizations are computed, instead of identifying workflow pattern instances in the given process model first. In an exemplary embodiment, object pairs are computed using downstream and upstream control objects at step 306, as will now be described.

Downstream and upstream control objects are defined according to Definition 4 provided in the equations (dco(e) and uco(e)) described below. Given a process model P=(G, O, σ) where G=(N, E), each edge e∈E is associated with downstream and upstream control objects, dco(e), uco(e)⊆O, respectively, defined as follows:

$$dco(e) = \begin{cases} \emptyset & \text{if } e \text{ is the outgoing edge of the start node} \\ \{O_a\} & \text{if } e \text{ is the outgoing edge of activity } a \in N_A \\ \bigcup_{i=1}^{m} dco(e_i) & \text{otherwise, where } e_1 \ldots, e_m \text{ are the incoming edges of} \\ & n, \text{which has } e \text{ as its outgoing edge} \end{cases}$$

$$uco(e) = \begin{cases} \emptyset & \text{if } e \text{ is the incoming edge of the stop node} \\ \{O_a\} & \text{if } e \text{ is the incoming edge of activity } a \in N_A \\ \bigcup_{i=1}^{m} uco(e_i) & \text{otherwise, where } e_1 \ldots, e_m \text{ are the outgoing edges of} \\ & n, \text{which has } e \text{ as its incoming edge} \end{cases}$$

Downstream and upstream control objects may be computed for a given centralized (process) model using data flow analysis techniques. For example, to compute the downstream control objects, dco(e) is initialized to an empty set for each edge e and then the nodes in the process model are traversed, evaluating the dco equations (i.e., dco(e)) for each outgoing edge of the traversed node. Reverse post order traversal ensures that each node is visited once in the absence of cycles. In the presence of cycles, the nodes may be traversed repeatedly until a fixpoint is reached, i.e., an iteration when no dco values are updated. FIG. 2 shows the alumni day model 200 with the downstream and upstream control objects indicated above and below each edge (within parentheses { }), respectively.

The set of object pairs for performing control handover is provided in Definition 5 as follows:

Given a process model $P=(G, O, \sigma)$ where $G=(N,E)$, and each of the edges $e_1, \ldots, e_n$ is an incoming edge of some activity $a \in N_A$, the set of directed object pairs that require BSMs to perform control handover is defined as follows:

$$O^{ch}(P) = \bigcup_{i=1}^{n} (dco(e_i) \times uco(e_i)) \setminus \{(o, o) \mid o \in O\}$$

For example, an incoming edge 238 of the AD activity 240 of the model 200 of FIG. 2, gives rise to two control handover object pairs: (R,N) and (C,N); and the incoming edge 250 of the AB 252 activity gives rise to only one control handover object pair: (R,C). At step 308, control handover object pairs are computed by the coupling predictor logic 112 based upon the upstream and downstream control objects from step 306.

Object pairs that require decision notification between BSMs are then defined. Given a decision d, its outgoing edges are denoted by $E_d^{out}$, and it is assumed that d's evaluation can be assigned to the object co(d), which is one of the upstream control objects of some edge in $E_d^{out}$.

Given a process model $P=(G, O, \sigma)$ where $G=(N,E)$, the set of directed object pairs that require decision notification between BSMs is provided in Definition 6 as follows:

$$O^{dn}(P) = \bigcup_{d \in N_D} \left( co(d) \times \bigcup_{e \in E_d^{out}} uco(e) \right) \setminus \{(o, o) \mid o \in O\}$$

A decision 260 in the alumni day model 200 of FIG. 2 is assigned to object N and gives rise to one decision notification object pair: (N,C). A decision 270 in the Fix Date sub-process 202 is assigned to object D. It does not introduce any decision notification object pairs, since the sets of upstream control objects for both edges going out of the decision are the same: {D}. At step 310, decision notification object pairs are determined by the coupling predictor logic 112 based upon the upstream and downstream control objects from step 306.

A predicted assembly model for a BSM implementation of the given model 200 of FIG. 2 may now be constructed by introducing a component for each object and a communication channel for each of the control handover and decision notification object pairs.

Given a process model $P=(G, O, \sigma)$, the predicted assembly model for a BSM implementation of P is provided in Definition 7 as follows:

$$MP = (C_P, \phi_P)$$

where $C_P = \{c_{o_1}, \ldots, c_{o_n}\}$ is the set of components, with one component $c_{o_i}$ for each object $o_i \in O$ where $1 \leq i \leq n$, and $\phi_P = \{(c_{o_1}, c_{o_2}) \in C_P \times C_P \mid (o_1, o_2) \in O^{ch}(P) \cup O^{dn}(P)\}$ is the communication channel (wire) relation between components.

Figure 8:
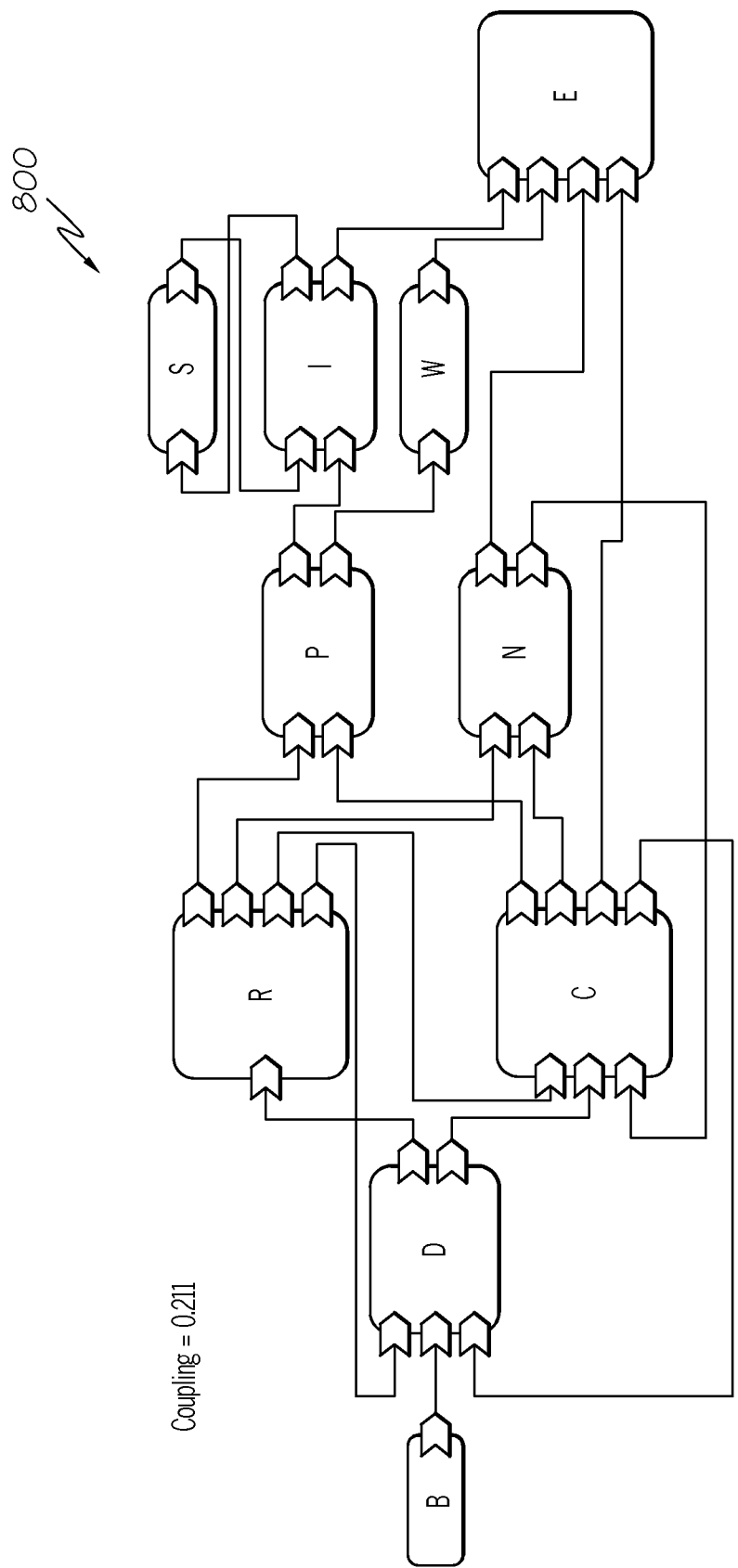
FIG. 8 is an assembly model diagram depicting results of application of the component coupling management processes with respect to the centralized model of FIG. 2 in accordance with exemplary embodiments.

At step 312, a predicted component model for an object-centric implementation of the centralized model is computed by the coupling predictor logic 112. An assembly model 800 for the alumni day model 200 of FIG. 2 is shown in FIG. 8. It can be seen that each distinct control handover and decision notification object pair, such as (R,N) or (C,N), introduces a communication channel in the predicted assembly model 800.

At step 314, coupling values are determined for the predicted component model by the coupling predictor logic 112.

Using the coupling definition provided in Definition 2 above, the interface coupling computed for the entire assembly model 800 of FIG. 8 is $$\frac{19}{10 * 9} \approx 0.211.$$

Apart from the overall coupling, which is rather low in this example, coupling of all component subsets may also be computed to identify areas of high coupling that may need revision. A configurable upper bound for coupling (e.g., a threshold value) may be used to identify highly coupled sets of components that require attention.

At step 316, the coupling predictor logic 112 compares the coupling value of the component model to the threshold value. At step 318, the coupling predictor logic 112 determines whether the coupling value exceeds the threshold value. For example, given a coupling upper bound (i.e., threshold value) of 0.8, e.g., component sets {D,R}, {D,C}, {N,C}, {I,S}, and {D,R,C} of model 800 are identified as highly coupled, as shown in FIG. 8. As indicated above, it is desirable to avoid distribution of highly coupled components, as it can result in high communication costs. Interdependencies of such components also challenge their maintenance and run-time adaptation, since changes in one component may have side effects on the behavior of other components.

If it is determined that the coupling value exceeds the threshold value at step 318, the coupling predictor logic 112 may modify the centralized model at step 320. Possible preventive actions include identification of objects that can be represented by a merged life cycle and refactoring control flow in the process model. Object merger is applicable only for those objects that have a strong semantic relationship, identified manually or by consulting a relevant ontology. Process model refactorings that reduce control handovers and decision notifications can alleviate high component coupling. After modifying the centralized model at step 320, the process returns to step 306, whereby the coupling computations are repeated to ensure that component coupling is sufficiently reduced. Otherwise, if the coupling value is equal to, or less than, the threshold value at step 318, an object-centric process implementation of the centralized model may be generated and executed by the coupling predictor logic, in conjunction with the Web services suite 110, at step 322.

It will be understood from the above-described processes, when a high coupling value is predicted for the entire assembly model, this may indicate that an object-centric implementation path may not be suitable for the process model and an activity-centric implementation approach may then be considered.

As indicated above, process models may include one or more activities, where at least one of the activities changes the state of more than one object. In an exemplary embodiment, an activity that changes state of more than one object may be placed into multiple BSMs, which may then be synchronized as described above. As such activities give rise to communication channels in the resulting assembly model and, thus, contribute to the overall coupling, the exemplary embodiments of the component coupling management processes may be extended to handle such activities, e.g., by adding a new synchronization category (referred to as "activity synchronization") and providing a definition for computing the object pairs requiring such synchronization. For example, the definition for activity synchronization may combine elements of Definitions 5 and 6 outlined above.

As indicated above, coupling for process models comprising instances of patterns WP1-WP5, WP10 and WP14 may be currently predicted. Handling of other patterns (e.g., uncommon workflow patterns) may be realized by investigating BSM solutions for these patterns, identifying pattern requirements for synchronization of BSMs and extending the above-referenced Definitions 5, 6 and 7, accordingly.

In component-based development, coupling has been used for component identification and refactoring, e.g., implementing clustering analysis to form components that have high cohesion and low coupling. Such approaches are complementary to the component coupling management processes described herein, as they may assist in identifying how the highly coupled components in the predicted assembly model of a BSM implementation can be alleviated.

Different categories or types of coupling have been identified in software engineering. Given source code or a component model, the different coupling values may be calculated, since the metrics are defined directly in terms of source code or component model elements. The exemplary embodiments of the component coupling management processes determine how the control flow in a given process model influences coupling of the resulting BSM implementation before actually deriving the BSMs. As described herein, the component coupling management processes has been illustrated using interface coupling of SCA components; however, it will be understood by those skilled in the art that other types of coupling, such as data coupling, may also be applied.

A tight correlation between semantic relationships of objects and synchronization of their life cycles has been identified in manufacturing processes. In manufacturing, objects are naturally coupled by the "part-of" relationship. The exemplary embodiments of the component coupling management processes approach is relevant in this context, since it can identify whether the implementation components have dependencies other than those resulting from the semantic relationships between objects.

The process software implementing the component coupling management processes may, as previously described, reside on a stand-alone computer system which may have access to the Internet, or may reside on a computer system which is part of the network through which there is Internet access. With a connection to a network and/or the Internet, there are several different ways in which the process software used to implement the component coupling management processes may be integrated with the network, and deployed using a local network, a remote network, an e-mail system, and/or a virtual private network. The following descriptions review the various ways of accomplishing these activities.

Integration of component coupling management processes system software will now be described. To implement the component coupling management processes and systems and methods, process software, which is composed of the software as described above and related components including any needed data structures, is written and then if desired, integrated into a client, server and network environment. This integration is accomplished by taking those steps needed to enable the process software to coexist with other application, operating system and network operating system software and then installing the process software on the clients and servers in the environment where the process software will function. An overview of this integration activity will now be provided, followed by a more detailed description of same with reference to the flowcharts of FIGS. 9A and 9B.

The first step in the integration activity is to identify any software on the clients and servers where the process software will be deployed that are required by the process software or that need to work in conjunction with the process software. This includes the network operating system, which is the software that enhances a basic operating system by adding networking features.

Next, the software applications and version numbers are identified and compared to the list of software applications and version numbers that have been tested to work with the process software. Those software applications that are missing or that do not match the correct version are upgraded with the correct version numbers. Program instructions that pass parameters from the process software to the software applications will be checked to ensure the parameter lists matches the parameter lists required by the process software. Conversely, parameters passed by the software applications to the process software will be checked to ensure the parameters match the parameters required by the process software. The client and server operating systems including the network operating systems are identified and compared to the list of operating systems, version numbers and network software that have been tested to work with the process software. Those operating systems, version numbers and network software that do not match the list of tested operating systems and version numbers are then upgraded on the clients and servers to the required level.

After ensuring that the software resident on the computer systems where the process software is to be deployed is at the correct version level(s); that is, has been tested to work with the process software, the integration is completed. This is done by installing the process software on the clients and servers. Armed with the foregoing overview of the integration activity, the following detailed description of same should be readily understood.

Figure 9A:
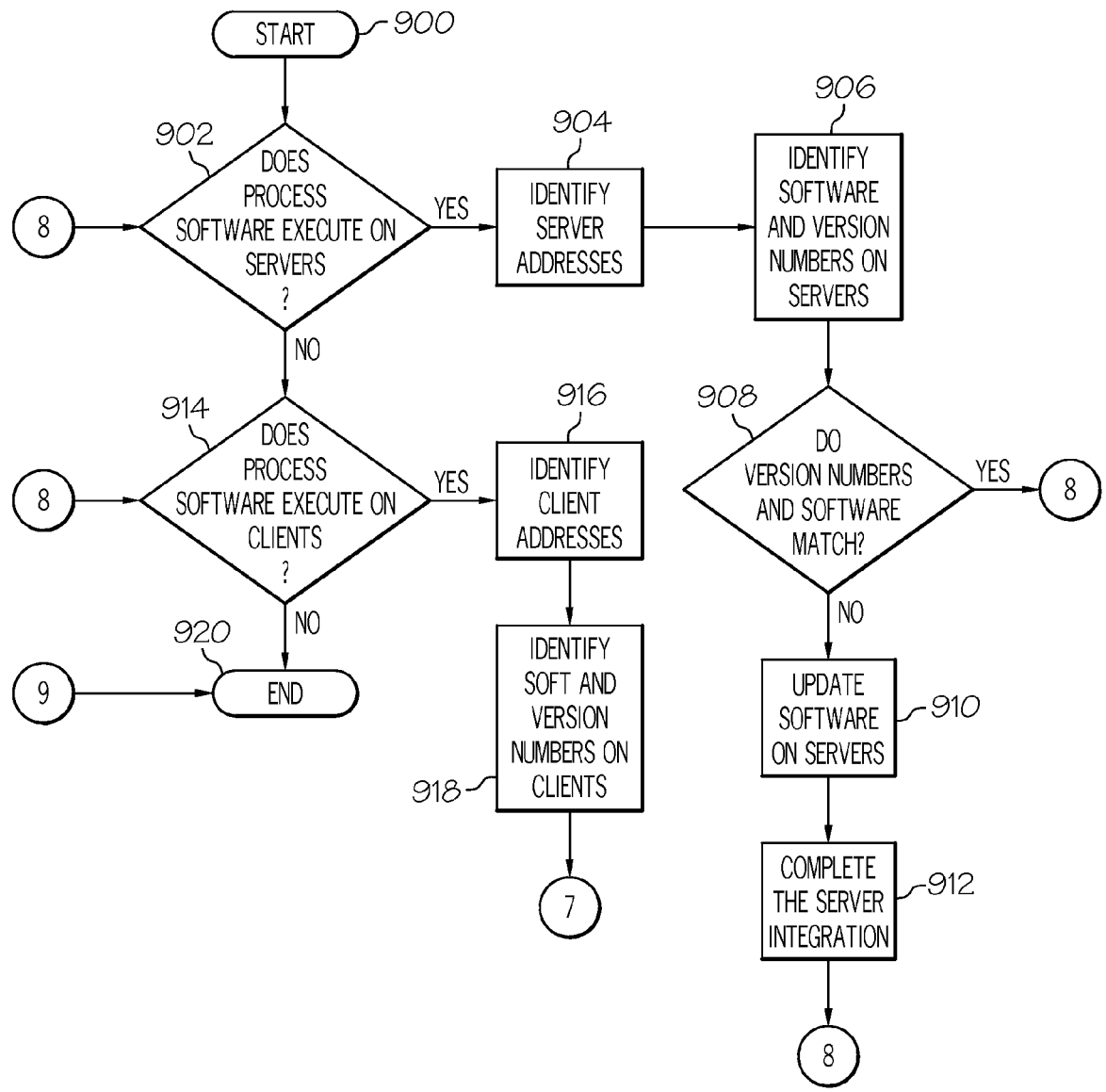
FIGS. 9A and 9B are flowcharts illustrating how process software implementing the component coupling management processes may be integrated into client, server, and network environments in accordance with exemplary embodiments.
Figure 9B:
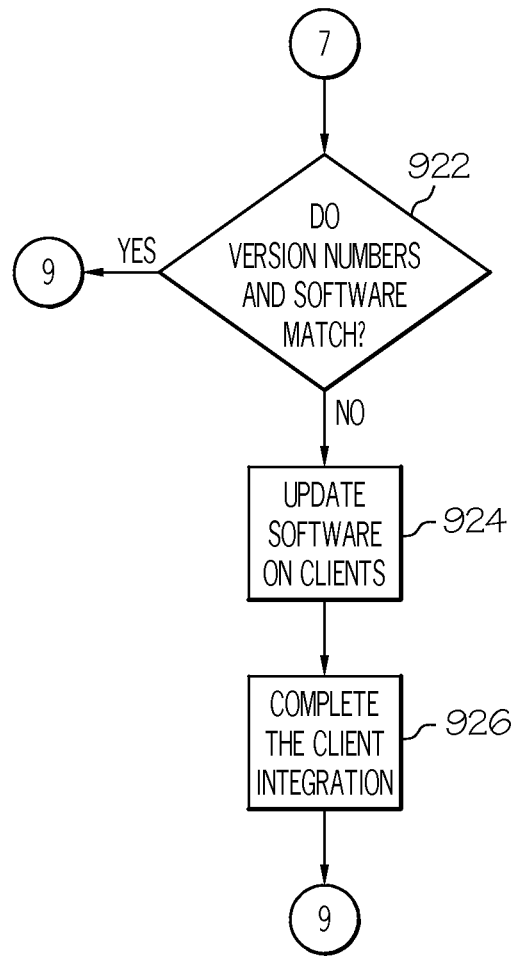

Referring to FIGS. 9A and 9B, step 900 begins the integration of the process software for implementing the component coupling management processes' systems and methods. It is determined whether there are any process software programs that will execute on a server or servers at step 902. If this is not the case, then integration proceeds to determine if the process software will execute on clients at step 914. If this is the case, then the server addresses are identified at step 904. The servers are checked to see if they contain software that includes the operating system (OS), applications, and network operating systems (NOS), together with their version numbers, that have been tested with the process software at step 906. The servers are also checked to determine if there is any missing software that is required by the process software as part of the activity at step 906. A determination is made if the version numbers match the version numbers of OS, applications and NOS that have been tested with the process software at step 908. If all of the versions match, and there is no missing required software, the integration continues at step 914. If one or more of the version numbers do not match, then the unmatched versions are updated on the server or servers with the correct versions at step 910. Additionally, if there is missing required software, then it is updated on the server or servers at step 910. The server integration is completed by installing the process software at step 912.

Step 914, which follows either of steps 902, 908 or 912, determines if there are any programs of the process software that will execute on the clients. If no process software programs execute on the clients, the integration proceeds to step 920 and exits. If this not the case, then the client addresses are identified at step 916.

At step 918, the clients are checked to see if they contain software that includes the operating system (OS), applications, and network operating systems (NOS) software, together with their version numbers, that have been tested with the process software. The clients are also checked at step 918 to determine if there is any missing software that is required by the process software.

At step 922, a determination is made if the version numbers match the version numbers of OS, applications and NOS that have been tested with the process software. If all of the versions match and there is no missing required software, then the integration proceeds to step 920 and exits.

If one or more of the version numbers do not match, then the unmatched versions are updated on the clients with the correct versions at step 924. In addition, if there is missing required software, then the required software is updated on the clients as part of step 924. The client integration is completed by installing the process software on the clients at step 926. The integration proceeds to step 920 and exits.

Deployment of component coupling management processes system software will now be described. It should be well understood that the process software for implementing the component coupling management processes' system may be deployed by manually loading the process software directly into the client, server and proxy computers from a suitable storage medium such as a CD, DVD, etc. It is useful to provide an overview of still other ways in which the process software may also be automatically or semi-automatically deployed into one or more computer systems. The process software may be deployed by sending or loading the process software to a central server or a group of central servers. From there, the process software may then be downloaded into the client computers that will execute the process software. Alternatively, the process software may be sent directly to the client system via e-mail. The process software is then either detached to a directory or loaded into a directory by a button on the e-mail that executes a program that detaches the process software attached to the e-mail into a directory. Another alternative is to send the process software directly to a directory on the hard drive of a client computer. Also, when there are proxy servers, the automatic or self-automatic deployment process will select the proxy server code, determine on which computers to place the proxy servers' code, transmit the proxy server code, and then install the proxy server code on the proxy computer. The process software will be transmitted to the proxy server and stored on the proxy server. Armed with this overview of the possible deployment processes, the following detailed description of same with reference to FIGS. 10A and 10B, where the deployment processes are illustrated, will be more easily understood.

Step 1000 begins the deployment of the process software. It is determined whether there are any programs that will reside on a server or servers when the process software is executed at step 1002. If the answer is "yes," then the servers that will contain the executables are identified, as indicated in step 1036 in FIG. 10B. The process software for the server or servers is transferred directly to the servers' storage via FTP or some other protocol or by copying though the use of a shared file system at step 1038. The process software is then installed on the servers as indicated at step 1040.

Figure 10A:
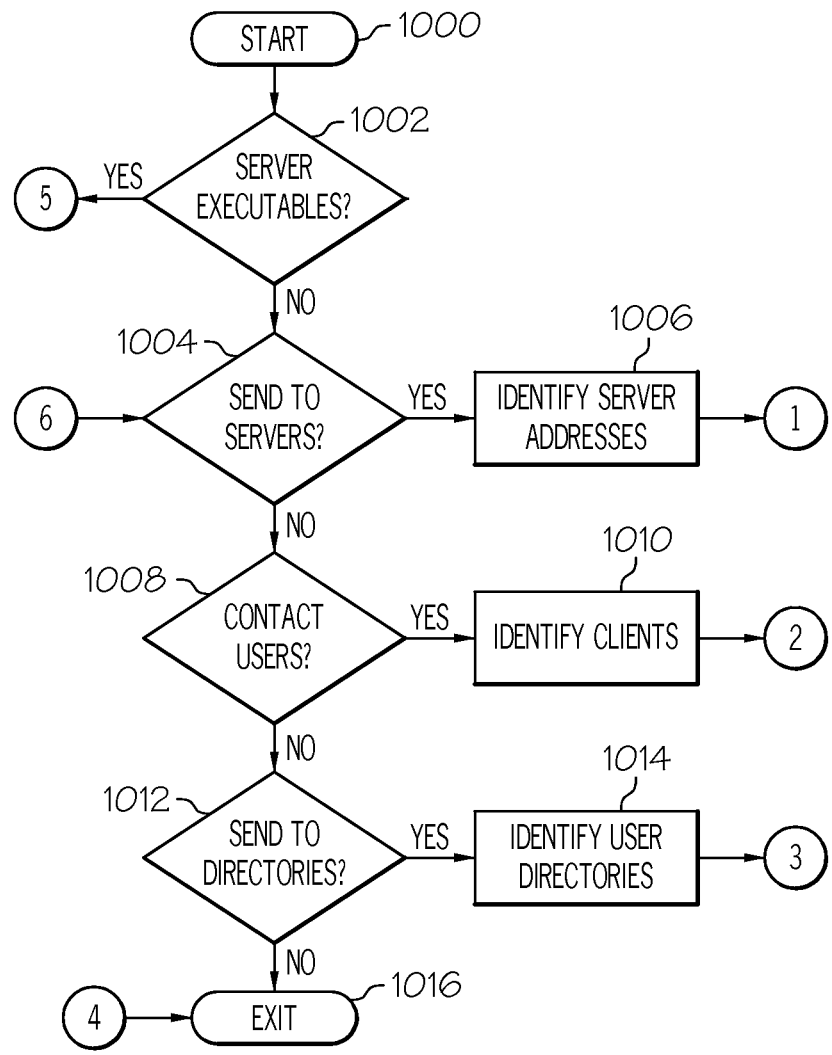
FIGS. 10A and 10B are flowcharts illustrating various ways in which the process software may be semi-automatically or automatically deployed across various networks and onto server, client (user), and proxy computers in accordance with exemplary embodiments.
Figure 10B:
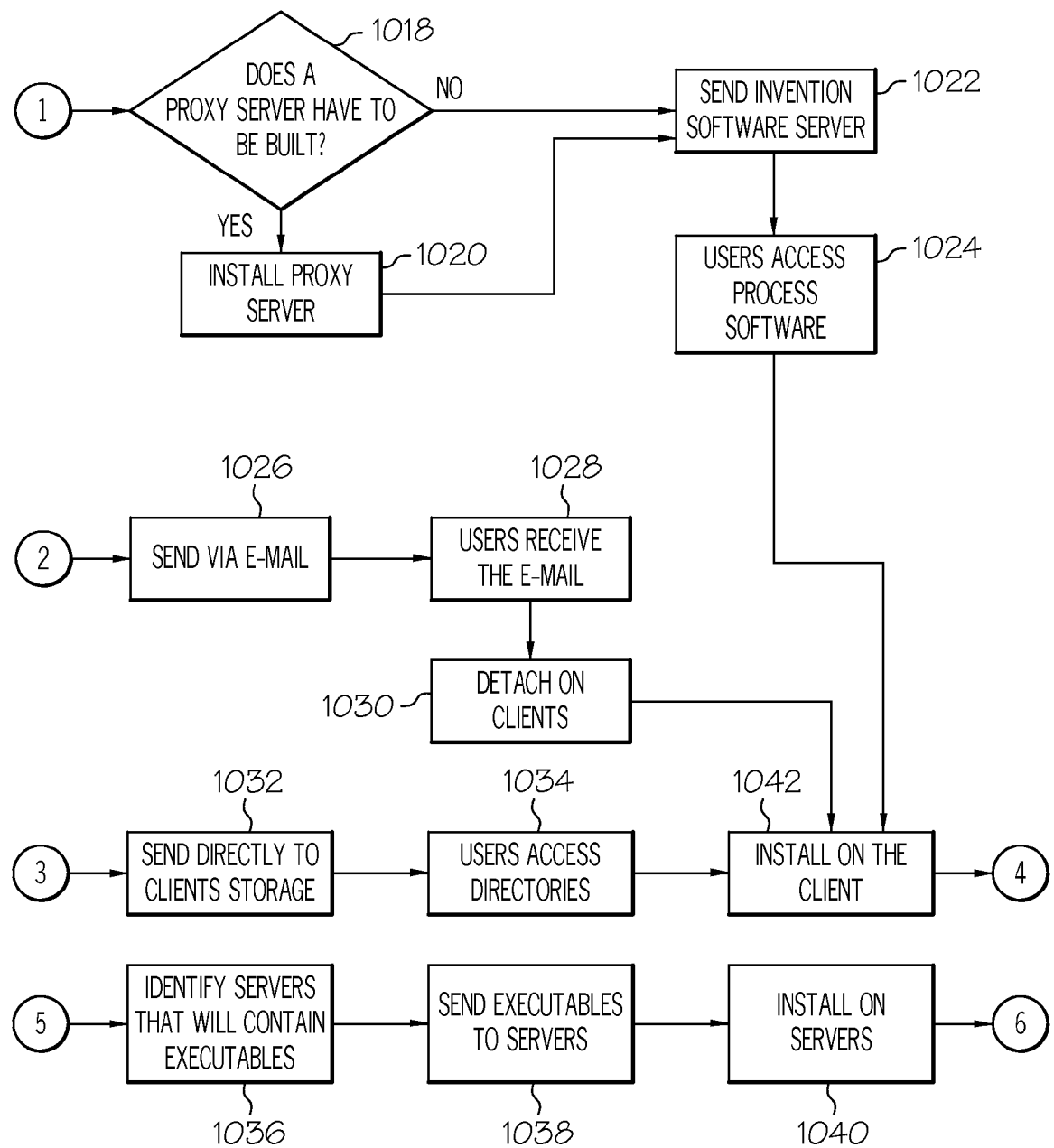

Next, as shown in step 1004 of FIG. 10A, a determination is made of whether the process software is to be deployed by having users access the process software on a server or servers. If the users are to access the process software on servers, then the server addresses that will store the process software are identified at step 1006.

Next, as shown at step 1018, a determination is made if a proxy server is to be built to store the process software. A proxy server is a server that sits between a client application, such as a Web browser, and a real server. It intercepts all requests to the real server to see if it can fulfill the requests itself If not, it forwards the request to the real server. The two primary benefits of a proxy server are to improve performance and to filter requests. If a proxy server is required, then the proxy server is installed as indicated at step 1020. Next, the process software for implementing the component coupling management processes is sent to the servers, as indicated in step 1022 either via a protocol such as FTP or it is copied directly from the source files to the server files via file sharing. Another way of sending the process software to the servers is to send a transaction to the servers that contain the process software and have the server process the transaction. In this manner, the process software may be received by and copied into the server's file system. Once the process software is stored at the servers, the users via their client computers then access the process software on the servers and copy it into to the file systems of their client computers at step 1024. Another alternative is to have the servers automatically copy the process software to each client and then run the installation program for the process software at each client computer. Either way, the user computer executes or causes to be executed the program that installs the process software on the client computer at step 1042 and the process exits at step 1016.

Continuing now at step 1008 in FIG. 10A, a determination is made as to whether the process software is to be deployed by sending the process software to users via e-mail. If the answer is yes, then, as indicated at step 1010, the set of users where the process software will be deployed are identified together with the addresses of the user client computers. The process software is sent via e-mail in step 1026 (shown in FIG. 10B) to each of the users' client computers. Then, as indicated in step 1028, the users receive the e-mail and detach the process software from the e-mail to a directory on their client computers at step 1030. The user then executes the program that installs the process software on his client computer at step 1042 and exits the process at step 1016.

Continuing at step 1012 (see bottom of FIG. 10A), a determination is made of whether the process software will be sent directly to user directories on their client computers. If so, the user directories are identified at step 1014. Then, the process software is transferred directly to the identified directory on the user's client computer, as indicated in step 1032. This can be done in several ways such as, but not limited to, sharing the file system directories and copying from the sender's file system to the recipient user's file system or, alternatively, using a transfer protocol such as File Transfer Protocol (FTP). Next, the users access the directories on their client file systems, as indicated in step 1034, in preparation for installing the process software. Finally, the user executes the program that installs the process software on his client computer at step 1042 and then exits the process at step 1016.

Use of Virtual Private Networks for component coupling management processes system software will now be described. The process software may be deployed, accessed and executed through the use of a virtual private network (VPN). A VPN is any combination of technologies that can be used to secure a connection through an otherwise unsecured or untrusted network. VPNs are used to improve security and can often also reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee(s). Access to the software via a VPN can be provided as a service by specifically constructing the VPN for purposes of delivery or execution of the process software (i.e., the software resides elsewhere). In such an instance, the lifetime of the VPN is often limited to a given period of time or to a given number of deployments based on an amount paid.

The process software may be deployed, accessed and executed through either a remote-access VPN or a site-to-site VPN. When using a remote-access VPN, the process software is typically deployed, accessed, and executed via the secure, encrypted connections between a company's private network and remote users through a third-party service provider. The enterprise service provider (ESP) sets up and/or authorizes access to a network access server (NAS) and provides the remote users with desktop client software for their computers. The telecommuters may then dial a phone number (e.g., a toll-free number) or attach directly via a cable, DSL, or wireless modem to reach the NAS and use their VPN client software to access the corporate network and to access, download, and execute the process software.

When using a site-to-site VPN, the process software is typically deployed, accessed, and executed through the use of dedicated equipment and large-scale encryption. These tools are often used to connect multiple fixed sites of a larger company over a public network such as the Internet.

The process software is transported over the VPN via a process called tunneling. Tunneling is a process involving the placement of an entire packet within another packet and sending it over a network. The protocol of the outer packet is understood by the network and by both points, called tunnel interfaces, where the packet enters and exits the network. Tunneling generally encapsulates the private network data and protocol information within the public network transmissions so that the private network protocol information appears to the public network simply as unintelligible data. Armed with the foregoing overview of virtual private networks and how they operate and how they may be used to transport the process software, the following more detailed description of same with reference to the flowcharts of FIGS. 11A-11C should be more readily understood.

Figure 11A:
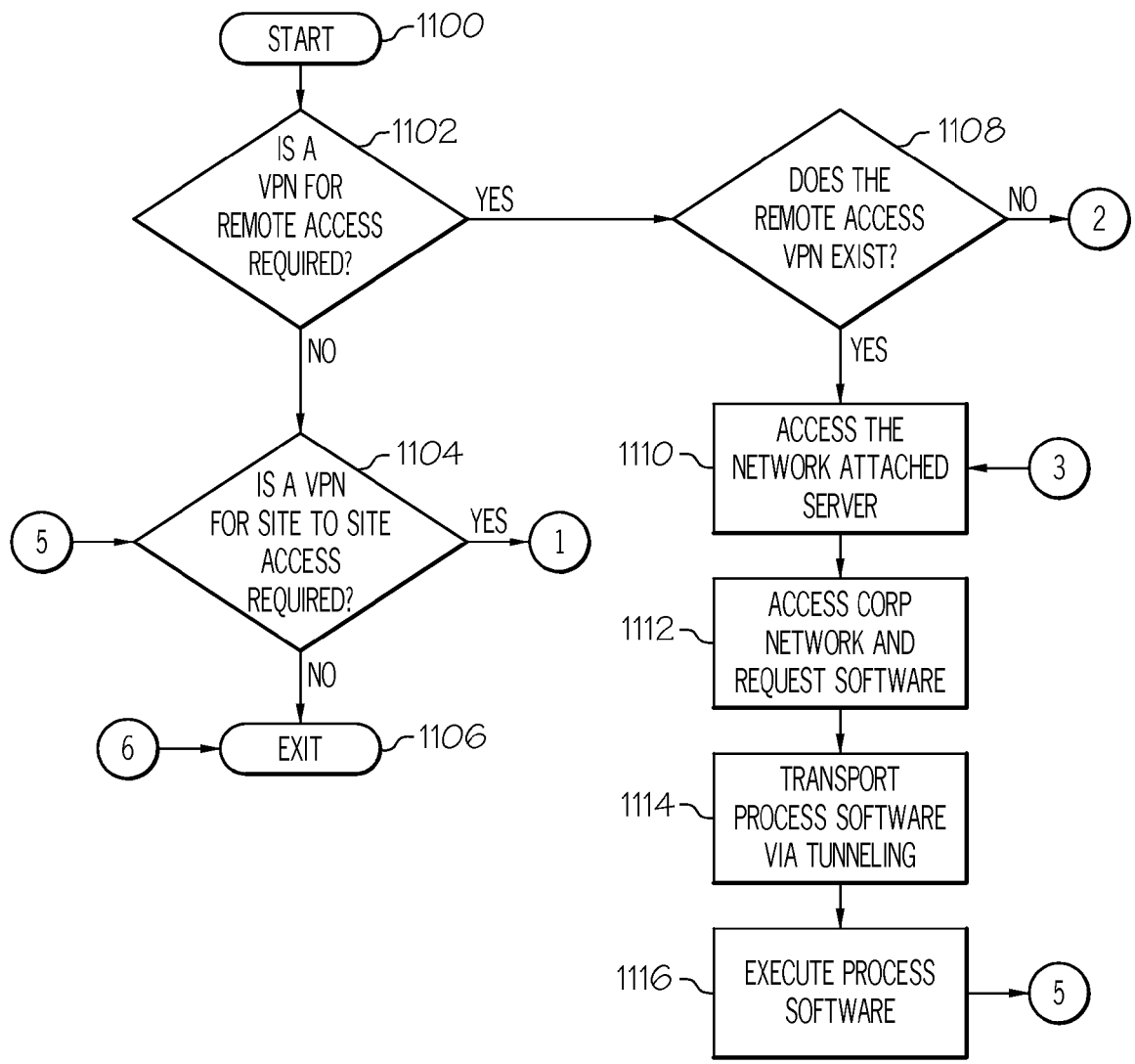
FIGS. 11A through 11C are flowcharts illustrating how process software for implementing the component coupling management processes are deployed through the installation and use of two different forms of a virtual private network (VPN) in accordance with exemplary embodiments.
Figure 11B:
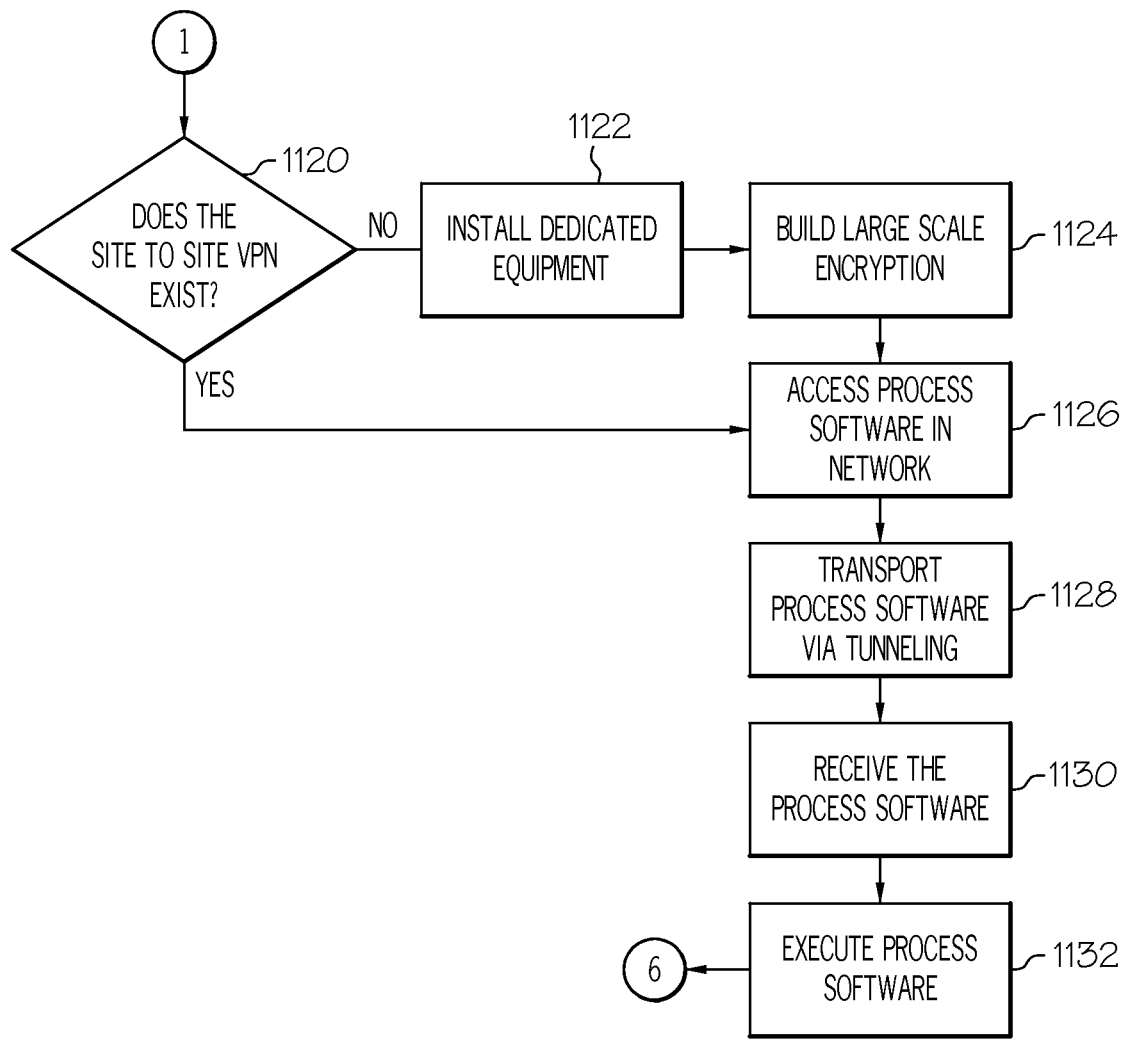
Figure 11C:
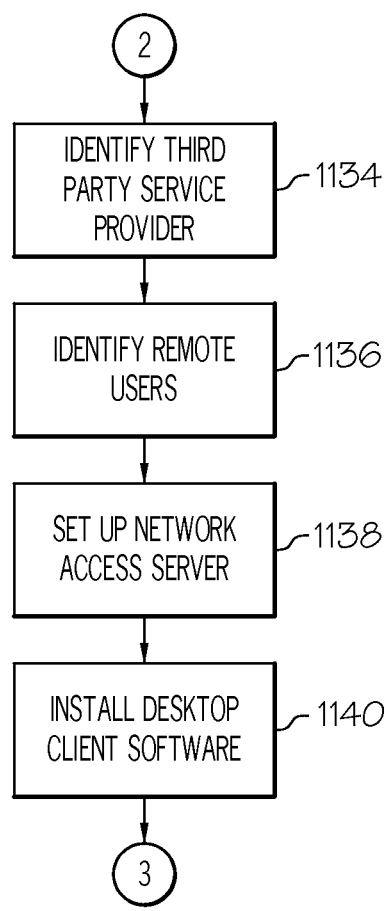

Step 1100 in FIG. 11A begins the virtual private network (VPN) process. A determination is made at step 1102 to see if a VPN for remote access is required. If it is not required, then flow proceeds to step 1104. If it is required, then flow proceeds to step 1108 where a determination is made if as to whether a remote access VPN exists that is available for use.

If a remote access VPN does exist, then flow proceeds to step 1110 in FIG. 11A. Otherwise flow proceeds to step 1134 (see top of FIG. 11C), where a third party provider that will provide the secure, encrypted connections between the company's private network and the company's remote users is identified. Next, as indicated in step 1136, the company's remote users are identified. Then, at step 1138, the identified third party provider sets up a network access server (NAS). The NAS allows the remote users to dial a phone number (e.g., a toll free number) or attach directly via a cable, DSL, wireless, or other modem to access, download, and install the desktop client software for the remote-access VPN as indicated at step 1140.

Returning to step 1110 in FIG. 11A, after the remote access VPN has been built or if it been previously installed, the remote users can then access the process software by dialing into the NAS or attaching directly via a cable, DSL, or other modem into the NAS. This step 1110 allows entry into the corporate network, as indicated at step 1112, where the process software may be accessed. The process software is transported to the remote user's desktop computer over the network via tunneling. During tunneling, see step 1114, the process software is divided into packets and each packet including the data and protocol for that packet, is placed within another packet. When the process software arrives at the remote user's desktop computer, it is removed from the packets, reconstituted, and then may be executed on the remote users desktop, as indicated at step 1116.

Returning now to step 1104 in FIG. 11A, a determination is made to see if a VPN for site-to-site access is required. If it is not required, then flow proceeds to the exit at step 1106. If it is required, flow proceeds to step 1120 (see top of FIG. 11B) to determine if the site-to-site VPN exists. If it does exist, then flow proceeds to step 1126. If it does not exist, then as indicated at step 1122, dedicated equipment required to establish a site-to-site VPN is installed. Then a large-scale encryption is built into the VPN at step 1124.

After the site-to-site VPN has been built, or if it had been previously established, the users access the process software via the VPN as indicated in step 1126. Next, the process software is transported to the site users over the network via tunneling as indicated in step 1128. As previously explained, the process software is divided into packets and each packet including the data and protocol is placed within another packet, as indicated in step 1130. When the process software arrives at the remote user's desktop, it is removed from the packets, reconstituted, and executed on the site user's desktop at step 1132 and the process proceeds to step 1106 and exits.

Figure 12A:
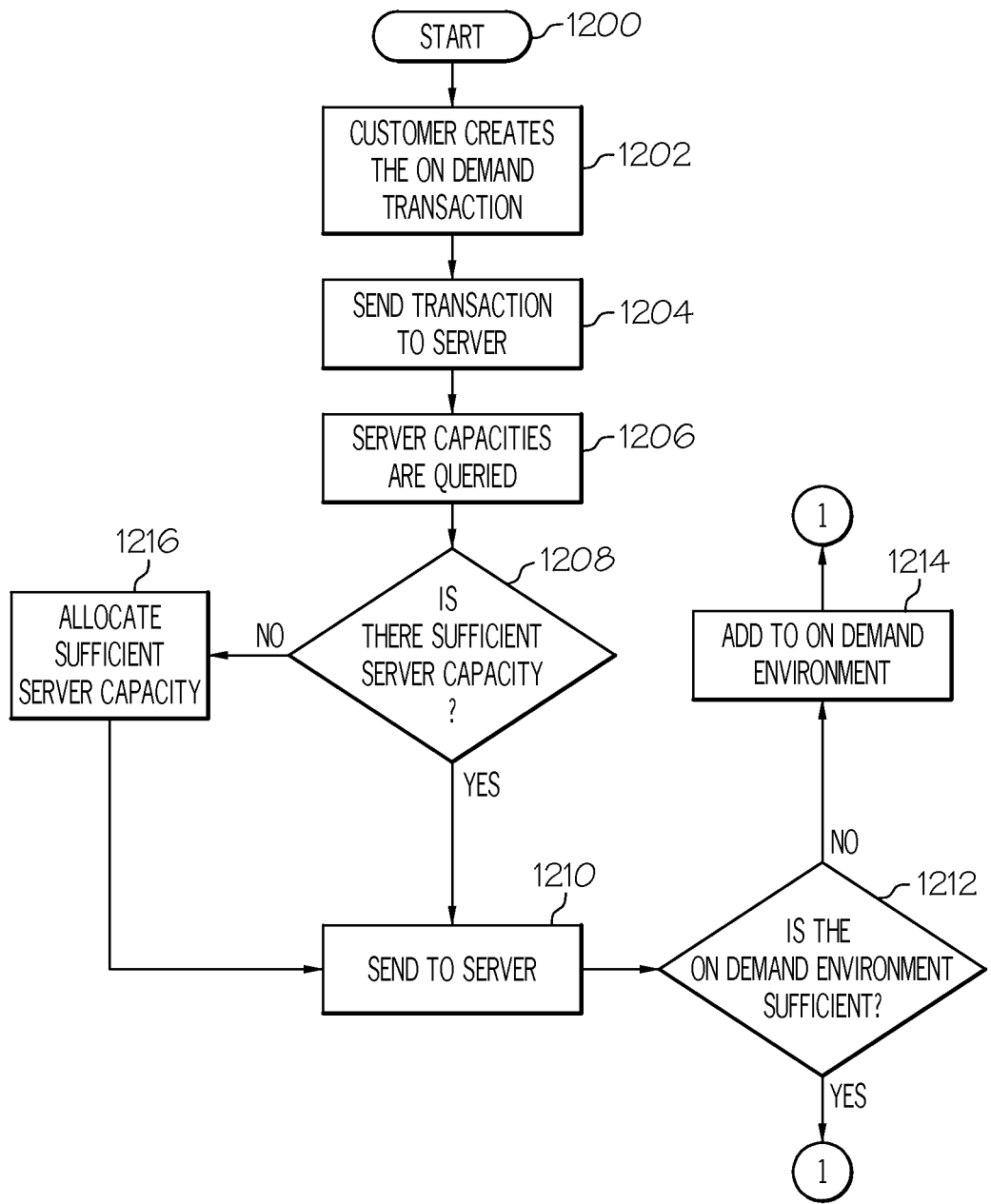
FIGS. 12A and 12B are flowcharts illustrating how the process software for implementing the component coupling management processes can be deployed through an On Demand business model, which allows the process software to be shared and simultaneously service multiple customers in a flexible, automated fashion under a pay-for-what-you-use plan in accordance with exemplary embodiments.
Figure 12B:
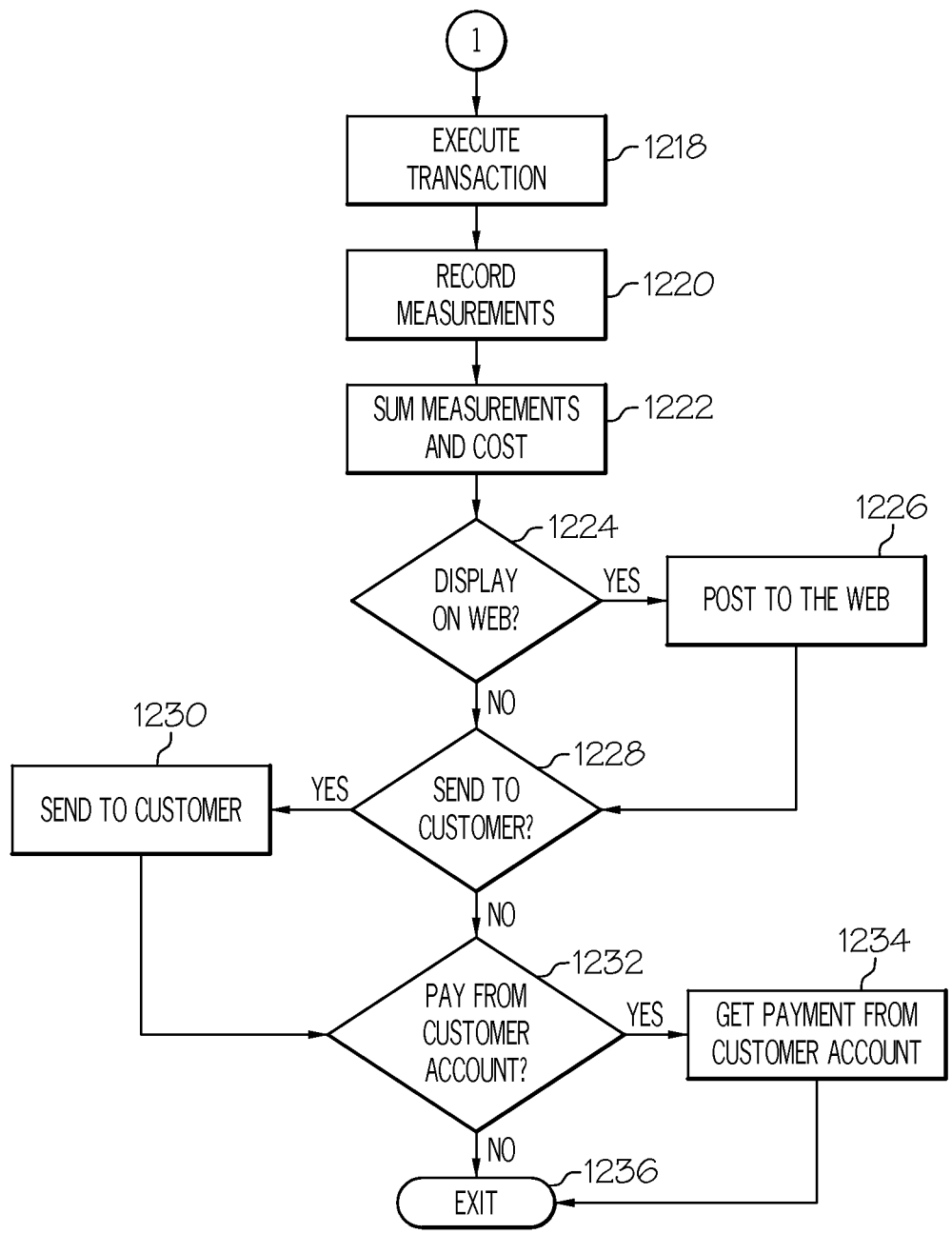

On demand computing for component coupling management processes system software will now be described. The process software for implementing the component coupling management processes system may be shared; that is, it may be used to simultaneously serve multiple customers in a flexible, automated fashion. It is process software that is easily standardized, requiring little customization, and is scalable, thus providing capacity on demand in a pay-as-you-go model known as "on demand" computing. An overview of on demand computing as applied to the component coupling management processes system software will now be provided, followed by a more detailed description of same made with reference to the flowcharts of FIGS. 12A and 12B.

The process software for implementing the component coupling management processes can be stored on a shared file system accessible from one or more servers. The process software may be executed via transactions that contain data and server processing requests that use measurable CPU units on the accessed server. CPU units are units of time such as minutes, seconds, and hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc., approach a capacity so as to affect performance, additional network bandwidth, memory usage, storage etc. are added as needed to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer who then remits payment to the service provider.

In another embodiment, the service provider requests payment directly from a customer account at a banking or financial institution. In yet another embodiment, if the service provider is also a customer of the customer that uses the process software application, the payment owed to the service provider is reconciled to the payment owed by the service provider to minimize the transfer of payments. Armed with the foregoing overview, the detailed description of the on demand computing with respect to the process software, the following detailed description of same with reference to FIGS. 12A and 12B where the on demand processes are illustrated, will be more easily understood.

Step 1200 begins the On Demand process. A transaction is created that contains the unique customer identification, the requested service type and any service parameters that further specify the type of service as indicated in step 1202. The transaction is then sent to the main server as shown in step 1204. In an On Demand environment, the main server may initially be the only server. As capacity is consumed, other servers are added to the On Demand environment.

The server central processing unit (CPU) capacities in the On Demand environment are queried at step 1206. The CPU requirement of the transaction is estimated, then the servers available CPU capacity in the On Demand environment are compared to the transaction CPU requirement to see if there is sufficient CPU available capacity in any server to process the transaction as indicated in step 1208. If there is not sufficient server CPU available capacity, then additional server CPU capacity is allocated to process the transaction as indicated in step 1216. If there was already sufficient available CPU capacity, the transaction is sent to a selected server at step 1210.

Before executing the transaction, a check is made of the remaining On Demand environment to determine if the environment has sufficient available capacity for processing the transaction as indicated at step 1212. This environment capacity consists of elements such as, but not limited to, network bandwidth, processor memory, storage, etc. If there is insufficient available capacity, then capacity will be added to the On Demand environment as indicated in step 1214. The required software to process the transaction is accessed, loaded into memory, and the transaction is executed as indicated in step 1218.

The usage measurements are recorded as indicated in step 1220. The usage measurements consist of the portions of those functions in the On Demand environment that are used to process the transaction. The usage of functions such as, but not limited to, network bandwidth, processor memory, storage and CPU cycles are recorded. The usage measurements are summed, multiplied by unit costs, and recorded as a charge to the requesting customer as indicated in step 1222.

If the customer has requested that the On Demand costs be posted to a web site as indicated in step 1224, then they are posted to a web site at step 1226. If the customer has requested that the On Demand costs be sent via e-mail to a customer address as indicated in step 1228, then they are sent to the customer via e-mail as indicated in step 1230. If the customer has requested that the On Demand costs be paid directly from a customer account at step 1232, then payment is received directly from the customer account at step 1234. The On Demand process proceeds to step 1236 and then exits.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for managing component coupling in an object-centric process implementation, comprising:
   prior to deriving components that implement a centralized model:
   analyzing the centralized model with a processor;
   computing couplings within the centralized model to define a coupling metric;
   computing a predicted component model using objects, activities, and the coupling metric of the centralized model; and
   modifying control flow of the centralized model when a value of the coupling metric exceeds a pre-defined threshold value, re-analyzing the centralized model having the modified control flow, and repeating the computing, modifying and re-analyzing until the coupling metric is less than or equal to the pre-defined threshold; and
   implementing an object-centric process with the processor having component coupling that is derived from the centralized model when the value of the coupling metric is equal to or less than the pre-defined threshold value.

2. The method of claim 1, wherein the centralized model is an activity-centric process model supplied as a specification for a business process, and wherein analyzing the centralized model to compute couplings resulting in a coupling metric includes:
   determining object dependencies by analyzing control flow between activities that change the state of objects in the centralized model;
   determining expected coupling of object lifecycle components; and
   identifying components determined to be highly coupled based upon the object dependencies determination.

3. The method of claim 1, wherein the coupling metric specifies a degree of coupling for object life cycle components.

4. The method of claim 1, wherein the coupling metric represents a ratio between an actual number of communication channels in the assembly model and the maximum possible number of communication channels between components in the assembly model.

5. The method of claim 1, further comprising:
   identifying common process behaviors represented in workflow patterns and identifying a manner in which solutions for different patterns contribute to the overall coupling in the centralized model.

6. The method of claim 1, wherein analyzing the centralized model to compute couplings within the centralized model includes:
   determining upstream and downstream control objects for each edge in the centralized model;
   computing control handover object pairs based on the upstream and downstream control object determination;
   computing decision notification object pairs based on the upstream and downstream control object determination; and
   deriving the predicted component model from the control handover object pairs and the decision notification object pairs.

7. The method of claim 1, wherein control flow of the centralized model is modified using refactoring techniques.

8. The method of claim 1, further comprising deploying process software for managing component coupling in an object-centric process implementation, the deploying comprising:
   installing the process software on at least one server;
   identifying server addresses for users accessing the process software on the at least one server;
   installing a proxy server if needed;
   sending the process software to the at least one server and copying the process software to a file system of the at least one server;
   sending the process software to at least a first client computer; and
   executing the process software on the first client computer.

9. The method of claim 8, wherein the installing the process software further comprises:
   determining if programs will reside on the at least one server when the process software is executed;
   identifying the at least one server that will execute the process software; and
   transferring the process software to storage for the at least one server.

10. The method of claim 8, wherein the sending the process software to the first client computer further includes having the at least one server automatically copy the process software to the first client computer, and running an installation program at the first client computer to install the process software on the first client computer.

11. The method of claim 8, wherein the sending the process software to the first client computer further comprises identifying a user and an address of the first client computer.

12. The method of claim 8, wherein the sending the process software to the first client computer includes sending the process software to at least one directory on the first client computer.

13. The method of claim 8, wherein the sending the process software to the first client computer includes sending the process software to the first client computer via e-mail.

14. The method of claim 1, further comprising integrating process software for managing component coupling in an object-centric process implementation, the integrating comprising:
   determining if the process software will execute on at least one server;
   identifying an address of the at least one server;
   checking the at least one server for operating systems, applications, and version numbers for validation with the process software, and identifying any missing software applications for the at least one server that are required for integration;
   updating the at least one server with respect to any operating system and application that is not validated for the process software, and providing any of the missing software applications for the at least one server required for the integration;
   identifying client addresses and checking client computers for operating systems, applications, and version numbers for validation with the process software, and identifying any software applications missing from the client computers that are required for integration;
   updating the client computers with respect to any operating system and application that is not validated for the process software, and providing any missing software application for the client computers required for the integration; and
   installing the process software on the client computers and the at least one server.

15. The method of claim 1, further comprising on demand sharing of process software for managing component coupling in an object-centric process implementation, the on demand sharing comprising:
   creating a transaction containing unique customer identification, requested service type, and service parameters;
   sending the transaction to at least one main server;
   querying the at least one main server about processing capacity associated with the at least one main server to help ensure availability of adequate resources for processing of the transaction; and
   allocating additional processing capacity when additional capacity appears needed to process the transaction, the additional processing capacity being selected from the group of additional capacities consisting of central processing unit capacity, processor memory capacity, network bandwidth capacity, and storage capacity.

16. The method of claim 15, further comprising recording a plurality of usage measurements selected from the group of usage measurements consisting of network bandwidth, processor memory, storage, and central processing unit cycles.

17. The method of claim 16, further comprising:
   summing the usage measurements;
   acquiring at least one multiplicative value associated with the usage measurements and with unit costs; and
   recording any such acquired multiplicative value as an on demand charge to a requesting customer.

18. The method of claim 17, further comprising at least one of:
  posting the on demand charge on a web site if requested by the requesting customer; and
  sending the on demand charge via e-mail to the requesting customer's e-mail address.

19. The method of claim 17, further comprising charging the on demand charge to the requesting customer's account if an account exists and if the requesting customer has selected a charge account payment method.

20. The method of claim 1, further comprising deploying, accessing, and executing process software for managing component coupling in an object-centric process implementation, the deploying, accessing, and executing process software implemented through a virtual private network, the method further comprising:
  determining if a virtual private network is required;
  checking for remote access to the virtual private network when it is required;
  if the remote access does not exist, identifying a third party provider to provide secure, encrypted connections between a private network and remote users;
  identifying the remote users; and
  setting up a network access server operable for downloading and installing client software on desktop computers for remote access of the virtual private network;
  accessing the process software;
  transporting the process software to at least one remote user's desktop computer; and
  executing the process software on the at least one remote user's desktop computer.

21. The method of claim 20, further comprising:
  determining if the virtual private network has a site-to-site configuration for providing site-to-site access, and if the virtual private network is not so available, installing equipment required to establish a site-to-site configuration for the virtual private network;
  installing large scale encryption into the site-to-site virtual private network; and
  accessing the process software through the site-to-site configuration with large scale encryption.

22. A system for managing component coupling in an object-centric process implementation, comprising:
  a computer processor; and
  coupling predictor logic executing on the computer processor, the coupling predictor logic implementing:
    prior to deriving components that implement a centralized model:
      analyzing the centralized model with a processor;
      computing couplings within the centralized model to define a coupling metric;
      computing a predicted component model using objects, activities, and the coupling metric of the centralized model; and
      modifying control flow of the centralized model when a value of the coupling metric exceeds a pre-defined threshold value, re-analyzing the centralized model having the modified control flow, and repeating the computing, modifying and re-analyzing until the coupling metric is less than or equal to the pre-defined threshold; and
    implementing an object-centric process with the processor having component coupling that is derived from the centralized model when the value of the coupling metric is equal to or less than the pre-defined threshold value.

23. The system of claim 22, wherein the centralized model is an activity-centric process model supplied as a specification for a business process, and wherein analyzing the centralized model to compute couplings resulting in a coupling metric includes:
  determining object dependencies by analyzing control flow between activities that change the state of objects in the centralized model;
  determining expected coupling of object lifecycle components; and
  identifying components determined to be highly coupled based upon the object dependencies determination.

24. The system of claim 22, wherein the coupling metric specifies a degree of coupling for object life cycle components.

25. The system of claim 22, wherein the coupling metric represents a ratio between an actual number of communication channels in the assembly model and the maximum possible number of communication channels between components in the assembly model.

26. The system of claim 22, wherein analyzing the centralized model to compute couplings within the centralized model includes:
  determining upstream and downstream control objects for each edge in the centralized model;
  computing control handover object pairs based on the upstream and downstream control object determination;
  computing decision notification object pairs based on the upstream and downstream control object determination; and
  deriving the predicted component model from the control handover object pairs and the decision notification object pairs.

27. A computer program product for managing component coupling in an object-centric process implementation, the computer program product including computer-readable program instructions embodied on a non-transitory computer storage medium, which when executed by a computer processor, cause the computer processor to implement:
  prior to deriving components that implement a centralized model:
    analyzing the centralized model with a processor;
    computing couplings within the centralized model to define a coupling metric;
    computing a predicted component model using objects, activities, and the coupling metric of the centralized model; and
    modifying control flow of the centralized model when a value of the coupling metric exceeds a pre-defined threshold value, re-analyzing the centralized model having the modified control flow, and repeating the computing, modifying and re-analyzing until the coupling metric is less than or equal to the pre-defined threshold; and
  implementing an object-centric process with the processor having component coupling that is derived from the centralized model when the value of the coupling metric is equal to or less than the pre-defined threshold value.

28. The computer program product of claim 27, wherein the centralized model is an activity-centric process model supplied as a specification for a business process, and wherein analyzing the centralized model to compute couplings resulting in a coupling metric includes:
  determining object dependencies by analyzing control flow between activities that change the state of objects in the centralized model;
  determining expected coupling of object lifecycle components; and identifying components determined to be highly coupled based upon the object dependencies determination.

29. The computer program product of claim 27, wherein the coupling metric specifies a degree of coupling for object life cycle components.

30. The computer program product of claim 27, wherein the coupling metric represents a ratio between an actual number of communication channels in the assembly model and the maximum possible number of communication channels between components in the assembly model.

31. The computer program product of claim 27, wherein analyzing the centralized model to compute couplings within the centralized model includes:
  determining upstream and downstream control objects for each edge in the centralized model;
  computing control handover object pairs based on the upstream and downstream control object determination;
  computing decision notification object pairs based on the upstream and downstream control object determination; and
  deriving the predicted component model from the control handover object pairs and the decision notification object pairs.

* * * * *